United States Patent
Wang et al.

(10) Patent No.: US 11,812,498 B2
(45) Date of Patent: Nov. 7, 2023

(54) SIDELINK DISCOVERY MESSAGE FORWARDING

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 17/405,774

(22) Filed: Aug. 18, 2021

(65) Prior Publication Data
US 2023/0054548 A1 Feb. 23, 2023

(51) Int. Cl.
*H04W 72/20* (2023.01)
*H04W 8/00* (2009.01)

(52) U.S. Cl.
CPC ........... *H04W 8/005* (2013.01); *H04W 72/20* (2023.01)

(58) Field of Classification Search
CPC ........... H04L 12/28; H04L 12/50; H04W 5/00
USPC .......................... 370/400, 401, 403, 395, 329
See application file for complete search history.

(56) References Cited

U.S. PATENT DOCUMENTS

2019/0116608 A1* 4/2019 Kim .................... H04W 72/04

FOREIGN PATENT DOCUMENTS

WO WO-2016163972 A1 * 10/2016 ........ H04W 72/1278

* cited by examiner

*Primary Examiner* — Dang T Ton
(74) *Attorney, Agent, or Firm* — Holland & Hart / Qualcomm

(57) ABSTRACT

This disclosure provides systems, methods and apparatus, including computer programs encoded on computer storage media, for sidelink discovery message forwarding. In some implementations, a first user equipment (UE) may receive a discovery message from a second UE. The discovery message may be part of a beam training procedure between the first UE and the second UE. The first UE may forward the discovery message to one or more other UEs based on a condition associated with one or more forwarding termination parameters being satisfied. The first UE may, in some implementations, select one of a broadcast transmission or a unicast transmission for forwarding the discovery message based on one or more parameters associated with the UE. The first UE may transmit the discovery message from the second UE to the one or more other UEs using the selected broadcast or unicast transmission when the condition is satisfied.

30 Claims, 12 Drawing Sheets

SIDELINK DISCOVERY MESSAGE FORWARDING

TECHNICAL FIELD

This disclosure relates to wireless communications, including sidelink discovery message forwarding.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

A method for wireless communication at a first user equipment (UE) is described. The method may include receiving, from a second UE, a discovery message of a beam training procedure between the first UE and the second UE and transmitting the discovery message from the second UE to the one or more other UEs when a condition associated with one or more forwarding termination parameters is satisfied.

An apparatus for wireless communication at a first UE is described. The apparatus may include a processing system, a first interface, and optionally, a second interface. The first interface may be configured to receive, from a second UE, a discovery message of a beam training procedure between the first UE and the second UE. The first interface or the second interface may be configured to transmit the discovery message from the second UE to the one or more other UEs when a condition associated with one or more forwarding termination parameters is satisfied.

Another apparatus for wireless communication at a first UE is described. The apparatus may include means for receiving, from a second UE, a discovery message of a beam training procedure between the first UE and the second UE and means for transmitting the discovery message from the second UE to the one or more other UEs when a condition associated with one or more forwarding termination parameters is satisfied.

A non-transitory computer-readable medium storing code for wireless communication at a first UE is described. The code may include instructions executable by a processor to receive, from a second UE, a discovery message of a beam training procedure between the first UE and the second UE and transmit the discovery message from the second UE to the one or more other UEs when a condition associated with one or more forwarding termination parameters is satisfied.

Some examples of the method, apparatuses, and non-transitory computer-readable medium described herein may further include operations, features, means, or instructions for selecting one of a broadcast transmission or a unicast transmission for transmitting the discovery message based on one or more parameters associated with the first UE and transmitting the discovery message to the one or more other UEs as at least a part of the selected one of the broadcast transmission or the unicast transmission.

In some examples of the method, apparatuses, and non-transitory computer-readable medium described herein, the one or more parameters associated with the first UE include a type of connection supported by the first UE, an indication of the one of the broadcast transmission or the unicast transmission received via the discovery message, a configuration for the first UE, a status of a network that includes the first UE, or any combination thereof.

In some examples of the method, apparatuses, and non-transitory computer-readable medium described herein, the condition being satisfied corresponds to an absence of an early termination message, a discovery response message, or both, within a termination window.

A method for wireless communication at a third UE is described. The method may include receiving, from a first UE, a discovery message of a beam training procedure between the first UE and a second UE, where the discovery message is associated with one or more forwarding termination parameters being satisfied and transmitting, to at least the first UE, the second UE, or both, a discovery response message based on the discovery message.

An apparatus for wireless communication at a third UE is described. The apparatus may include a processing system, a first interface, and optionally, a second interface. The first interface may be configured to receive, from a first UE, a discovery message of a beam training procedure between the first UE and a second UE, where the discovery message is associated with one or more forwarding termination parameters being satisfied. The first interface or the second interface may be configured to transmit, to at least the first UE, the second UE, or both, a discovery response message based on the discovery message.

Another apparatus for wireless communication at a third UE is described. The apparatus may include means for receiving, from a first UE, a discovery message of a beam training procedure between the first UE and a second UE, where the discovery message is associated with one or more forwarding termination parameters being satisfied and means for transmitting, to at least the first UE, the second UE, or both, a discovery response message based on the discovery message.

A non-transitory computer-readable medium storing code for wireless communication at a third UE is described. The code may include instructions executable by a processor to receive, from a first UE, a discovery message of a beam training procedure between the first UE and a second UE, where the discovery message is associated with one or more forwarding termination parameters being satisfied and transmit, to at least the first UE, the second UE, or both, a discovery response message based on the discovery message.

In some examples of the method, apparatuses, and non-transitory computer-readable medium described herein, receiving the discovery message may include operations, features, means, or instructions for receiving the discovery message via one of a broadcast transmission or a unicast transmission.

Some examples of the method, apparatuses, and non-transitory computer-readable medium described herein may further include operations, features, means, or instructions for transmitting, to at least the first UE, the second UE, or both via a broadcast transmission or a unicast transmission, an early termination message based on receiving the discovery message.

In some examples of the method, apparatuses, and non-transitory computer-readable medium described herein, the discovery message indicates discovery information including a set of time and frequency resources for the beam training procedure, a location of the second UE, mobility information associated with the second UE, system information, information associated with a serving base station, a beam sweeping pattern for the beam training procedure, or any combination thereof.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
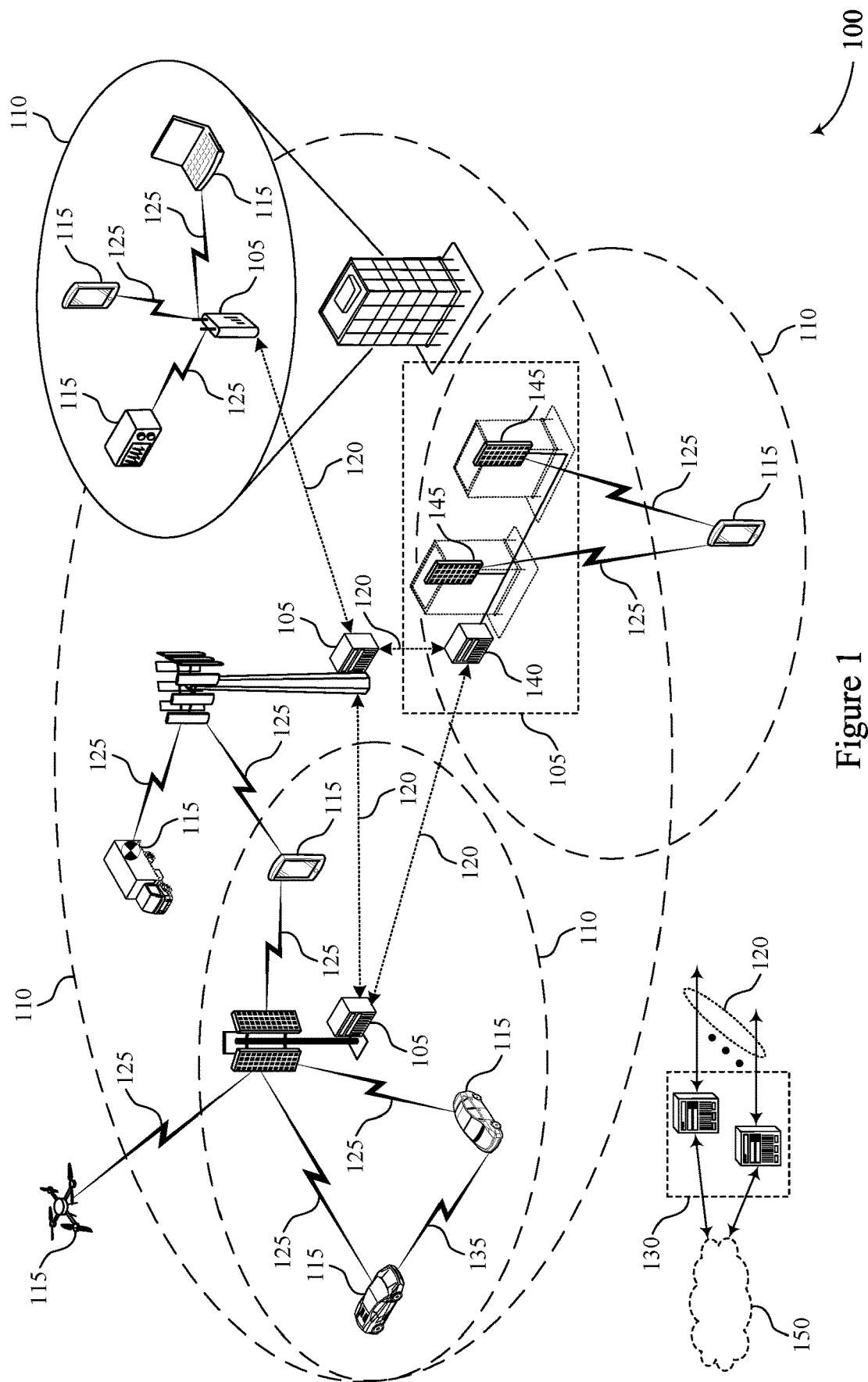
FIG. 1 illustrates an example of a wireless communications system that supports sidelink discovery message forwarding.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Some wireless communications systems may support sidelinks for communications between communication devices. Sidelinks may refer to any communication link between communication devices such as user equipments (UEs). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Some sidelink communications may be implemented over higher bands, such as FR2, FR2x, or FR4. In such implementations, sidelink UEs may perform beam sweeping to discover other UEs to which to connect. For example, a first UE may transmit a discovery message over multiple beams to find other UEs to which to connect and may establish a sidelink connection with one or more of the other UEs. For example, a second UE may receive the discovery message and may transmit a discovery response message to the first UE to indicate receipt of the discovery message. In some implementations, the first UE and the second UE may perform a beam training procedure to establish the sidelink connection, for example, in response to the discovery message and discovery response message exchange. Such beam sweeping operations may, in some implementations, result in relatively large overhead. To reduce overhead, a UE may transmit an initial discovery message via a single beam, or one or more narrow beams. Sidelink UEs that receive the discovery message may forward the discovery message to other UEs, such that one or more UEs in a group of UEs or a network may receive the discovery message. However, signaling and techniques for forwarding discovery messages may not be defined.

Techniques, systems, and devices are described herein for improving sidelink discovery procedures by configuring UEs with one or more parameters for forwarding discovery messages. A UE may utilize the one or more parameters to ascertain, select or determine whether to forward a discovery message, whether to forward the discovery message via a unicast or a broadcast transmission, what information to include in the discovery message, or any combination thereof. In some implementations, the one or more parameters may include forwarding termination parameters for ascertaining, selecting or determining whether to forward a discovery message. The forwarding termination parameters may correspond to receipt of a discovery response message, receipt of an early termination message, or both. A UE may be configured to forward a discovery message to one or more other UEs if a condition associated with the forwarding termination parameters is satisfied. That is, if the UE does not receive an early termination message or a discovery response message from another UE, the UE will forward the discovery message. The UE may be configured with a delay period, which may be referred to as a termination window, and the UE may wait for the delay period before forwarding the discovery message. As such, the delay period may provide for the UE to determine whether any discovery response or early termination messages are received from other UEs before forwarding the discovery message.

Additionally, or alternatively, the one or more parameters may include parameters for ascertaining, selecting or determining whether to forward the discovery message via a unicast or a broadcast transmission. The parameters may include a configuration for the UE, a network status, such as a resource utilization within the network, a connection status of the UE, or an indication received via the respective discovery message. The UE may forward the discovery message via one of the unicast transmission or the broadcast transmission based on the parameters. In some implementations, the UE may transmit sidelink discovery information via the discovery message or a discovery response message. For example, the discovery message and the discovery response message may each indicate information about beam training, information associated with a serving base station (BS), physical information related to one or more UEs, or any combination thereof. The UE may convey the additional discovery information via one or more fields in the discovery message, via a medium access control-control element (MAC-CE), via sidelink control information (SCI) that is associated with the discovery message, or any combination thereof. That is, the discovery information may be conveyed via signaling associated with a physical (PHY) layer or a medium access control (MAC) layer of the UE.

Particular implementations of the subject matter described in this disclosure can be implemented to realize one or more of the following potential advantages. For example, forwarding a discovery message based on one or more conditions associated with a set of parameters configured for the UE may reduce a quantity of times the discovery message is forwarded to a same UE to reduce power consumption and overhead. The UE may determine whether to forward the discovery message via a broadcast or unicast transmission in accordance with the set of parameters, such that the UE may refrain from broadcasting a message when the network is relatively busy. The set of parameters may thereby reduce overhead and interference and may improve communication reliability. Additionally, or alternatively, the UE may convey discovery information via signaling associated with the discovery message, a discovery response message, or both. The discovery information may improve coordination between devices and improve sidelink discovery and beam training procedures. Additionally, in some implementations, a UE may reuse an existing beam pair with another UE to forward a discovery message or a discovery response message, thereby improving communication reliability and efficiency.

FIG. 1 illustrates an example of a wireless communications system 100 that supports sidelink discovery message forwarding. The wireless communications system 100 may include one or more base stations (BSs) 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a coverage area 110 over which the UEs 115 and the BS 105 may establish one or more communication links 125. The coverage area 110 may be an example of a geographic area over which a BS 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or another interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers.

In some implementations (for example, in a CA configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some implementations the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the BSs 105, the UEs 115, or both) may have hardware configurations that support communications over a particular carrier bandwidth or may be configurable to support communications over one of a set of carrier bandwidths. In some implementations, the wireless communications system 100 may include BSs 105 or UEs 115 that support simultaneous communications via carriers associated with multiple carrier bandwidths. In some implementations, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier for distinguishing neighboring cells (for example, a physical cell identifier (PCID), a virtual cell identifier (VCID), or others). In some implementations, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other implementations.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). ABS 105 may support one or multiple cells and also may support communications over the one or more cells using one or multiple component carriers.

In some implementations, a carrier may support multiple cells, and different cells may be configured according to different protocol types (for example, MTC, narrowband IoT (NB-IoT), enhanced mobile broadband (eMBB)) that may provide access for different types of devices.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some implementations, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a BS 105 without human intervention. In some implementations, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some implementations, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1:M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

In some implementations, the D2D communication link 135 may be an example of a communication channel, such as a sidelink communication channel, between vehicles (for example, UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (for example, BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105). In various implementations, a BS 105, or an access network entity 140, or a core network 130, or some subcomponent thereof, may be referred to as a network entity.

As described herein, a BS 105 may include components that are located at a single physical location or components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 or a BS 105 including components that are located at various physical locations. In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some examples, such components of a BS 105 may include or refer to one or more of a central unit (CU), a distributed unit (DU), or a radio unit (RU).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on a CA configuration in conjunction with component carriers operating in a licensed band (for example, LAA). Operations in unlicensed spectrum may include downlink transmissions, uplink transmissions, P2P transmissions, or D2D transmissions, among other transmissions.

ABS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

ABS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (for example, a direction associated with the receiving device, such as a UE 115). In some implementations, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (for example, by a BS 105 or a UE 115) may be performed using multiple beam directions, and the device may use a combination of digital precoding or radio frequency beamforming to generate a combined beam for transmission (for example, from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some implementations, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

Two or more sidelink UEs 115 may perform a sidelink discovery and beam training procedure to establish a sidelink connection. For example, a second UE 115 may transmit a discovery message to at least a first UE 115. The first UE 115 may transmit a discovery response message to the second UE 115, and the first and second UEs 115 may perform a beam training procedure in accordance with the discovery message to establish a connection. In some implementations, the first UE 115 may additionally, or alternatively, forward the discovery message to one or more other UEs 115. Techniques described herein may provide for the first UE 115 to be configured with one or more forwarding termination parameters for ascertaining, selecting or determining whether to forward a discovery message to one or more other UEs 115. The first UE 115 may forward the discovery message if a condition associated with the one or more forwarding termination parameters is satisfied. The first UE 115 may, in some implementations, select one of a broadcast transmission or a unicast transmission for forwarding the discovery message based on one or more parameters associated with the first UE 115. The first UE 115 may transmit the discovery message from the second UE 115 to the one or more other UEs 115 using the selected broadcast or unicast transmission when the condition is satisfied.

Figure 2:
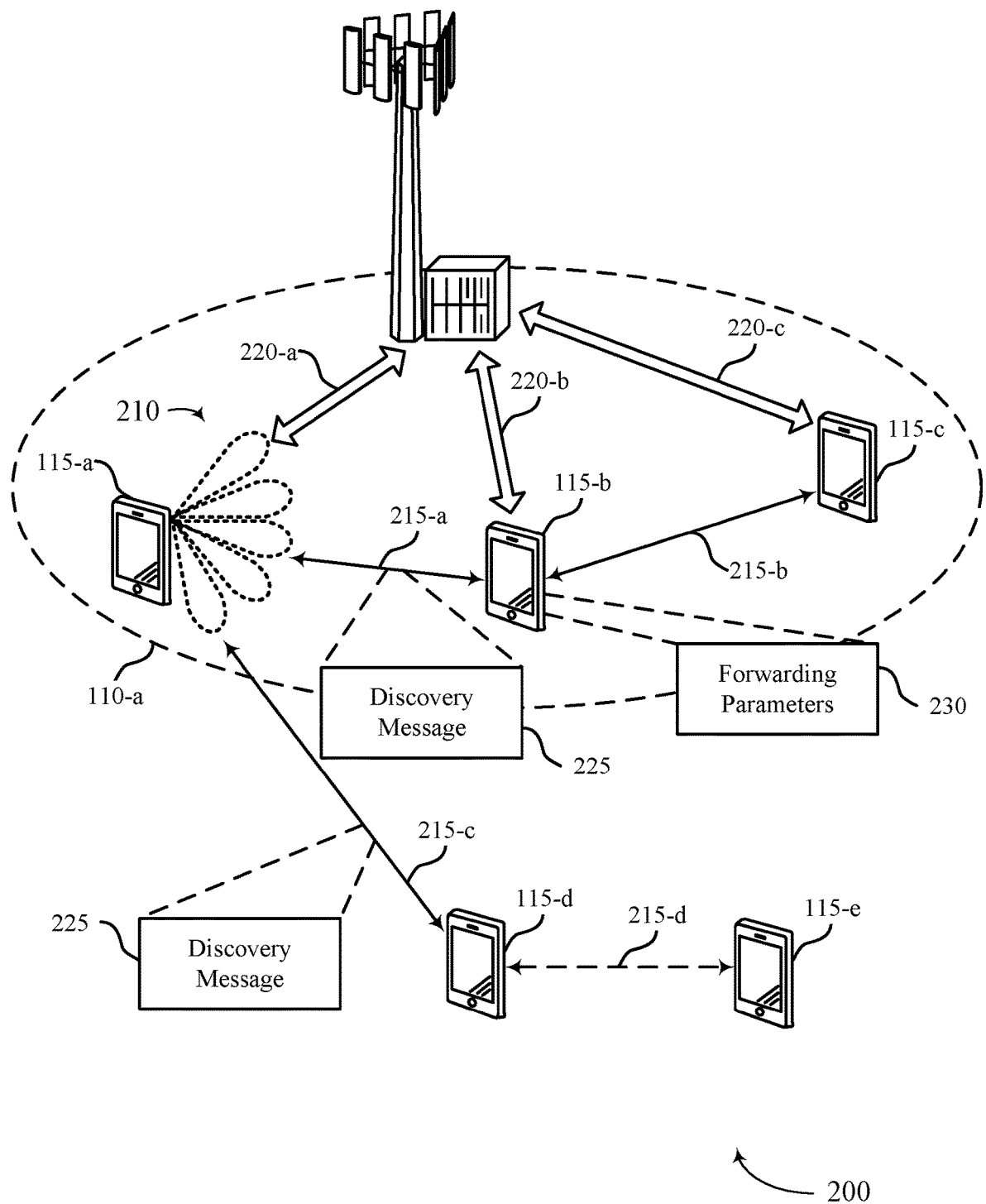
FIG. 2 illustrates an example of a signaling diagram that supports sidelink discovery message forwarding.

FIG. 2 illustrates an example of a signaling diagram 200 that supports sidelink discovery message forwarding. The signaling diagram 200 may implement or be implemented by aspects of the wireless communications system 100. For example, the signaling diagram 200 may include a BS 105-a and UEs 115-a, 115-b, 115-c, 115-d, and 115-e. Each of the UEs 115-a, 115-b, 115-c, 115-d, and 115-e may represent an example of a UE 115 as described herein, including with reference to FIG. 1. The BS 105-a may represent an example of a BS 105 as described herein, including with reference to FIG. 1. In some implementations, the BS 105-a and the UEs 115 may wirelessly communicate with each other via non-beamform communications or beamformed communications using a set of beams 210. Although the set of beams 210 is illustrated at the UE 115-a, it is to be understood that the BS 105-a and each of the UEs 115 illustrated in FIG. 2 may support communications using a respective set of beams 210.

The BS 105-a may communicate with the UEs 115-a, 115-b, and 115-c via the communication links 220-a, 220-b, and 220-c, respectively (which may represent examples of Uu links) and within a geographic coverage area 110-a. The UEs 115-d and 115-e may be out of coverage of the BS 105-a. That is, the BS 105-a may not communicate directly with the UE 115-d or the UE 115-e via an established connection within the geographic coverage area 110-a. The UEs 115-a, 115-b, 115-c, and 115-d may communicate with one another via sidelink communication links 215 (which may represent examples of PC5 links). For example, the UE 115-a and the UE 115-b may communicate via the sidelink communication link 215-a. The UE 115-b and the UE 115-c may communicate via the sidelink communication link 215-b. In the example of FIG. 2, the UE 115-d may establish a connection with the UE 115-a, and the UE 115-d may communicate with the UE 115-a via the sidelink communication link 215-c.

The UEs 115-a, 115-b, 115-c, and 115-d may have direct communication with one another without relaying information via the BS 105-a. The UEs 115 may perform a sidelink discovery procedure to establish each respective sidelink connection. For example, each UE 115 may periodically transmit synchronization signal blocks (SSBs) via respective beams (which may be referred to as SSB beams). If a UE 115 is not connected to at least one other UE 115, the UE 115 may monitor the SSB beams from one or more other UEs 115. By monitoring the SSB beams, the UE 115 may select at least one UE 115 of the one or more other UEs 115 to which to connect. Each UE 115 in the signaling diagram 200 may thereby establish a unicast connection and a beam pair between the UE 115 and at least one other UE 115.

The UEs 115-a, 115-b, 115-c, and 115-d may establish the respective sidelink connections and form a group of connected UEs 115, which may be referred to as a connected graph, a component, or some other terminology. The connected graph may be defined based on a path, such as a unicast connection via a sidelink communication link 215, being present between any two UEs 115 in the group. The group of UEs 115 may include a group leader. For example, the UE 115-a may be a group leader for the group of UEs 115-a, 115-b, 115-c, and 115-d. The group leader may broadcast messages to the other UEs 115 in the group periodically. The messages may indicate an ID of each UE 115 in the group. If one of the UEs 115-a, 115-b, 115-c, or 115-*d* of the group receives an SSB beam from a second UE 115 that is not in the same group, the UE 115 may connect to the second UE 115, such that the second UE 115 is included in the group.

In the example of FIG. 2, the UE 115-*e* may not be part of the group initially. The UE 115-*e* may periodically transmit SSB beams, and the UE 115-*d* may receive at least one of the SSB beams. The UE 115-*d* may connect to the UE 115-*e* in accordance with the SSB beam. That is, the UE 115-*d* and the UE 115-*e* may establish a connection, such as a unicast connection and communicate via the sidelink communication link 215-*d*. In some implementations, the UE 115-*e* may be part of a second group of UEs 115 (not pictured in FIG. 2), and the second group of UEs 115 may merge with the group of the UEs 115-*a*, 115-*b*, 115-*c*, and 115-*d* as a result of the connection between the UE 115-*d* and the UE 115-*e*. Additionally, or alternatively, the UE 115-*e* may not be connected to any other UEs 115, and the UE 115-*e* may join the group of UEs 115 in response to establishing the connection with the UE 115-*d*.

The UEs 115 may perform sidelink discovery within the group or connected graph. In some implementations, a network of UEs 115 may be a connected graph, and there may not be groups of UEs 115 defined within the network. If there are no groups defined within the network, sidelink discovery may be performed between each UE 115 of the network. A sidelink discovery procedure within a group of UEs 115 may include a first UE 115 transmitting, via a broadcast transmission or a unicast transmission, a discovery message 225 to other UEs 115 in the group. The discovery message 225 may include information for the other UEs 115 to use to identify potential UEs 115 for corresponding sidelink communications. The other UEs 115 may receive and decode the discovery message 225 and may ascertain, select or determine whether to establish a sidelink connection with the first UE 115 in accordance with the discovery message 225. The other UEs 115 may each transmit a discovery response message to the first UE 115 to indicate receipt of the discovery message 225.

The discovery procedure may, in some implementations, include a beam training procedure. For example, a transmitting UE 115, such as the UE 115-*a*, may transmit a discovery message 225 to a second UE 115 to initiate a sidelink connection. The discovery message 225 may include an indication of time and frequency resources for beam training. The time and frequency resources for beam training may be offset from the time and frequency resources used to convey the discovery message by a time gap. The UE 115-*a* may transmit the discovery message 225 to the second UE 115, such as the UE 115-*c*, directly or indirectly via other connected UEs 115 in the group, and the time gap may provide for the UEs 115 to propagate the discovery message 225. In some implementations, the forwarding of the discovery message 225 may be equivalent to a breadth-first search (BFS) of the sidelink UE group.

In some implementations, after the time gap, the UE 115-*c* may transmit a discovery response message to the UE 115-*a* via the relay UE 115-*b*. The UE 115-*c* may include some information in the discovery response message, such as a quantity of beams supported by the UE 115-*c*, a capability of the UE 115-*c*, or both to improve the beam training procedure. The UE 115-*a* may receive the discovery response message, and, after a second time gap, the UE 115-*a* may transmit beam training reference signals (BTRS) to the UE 115-*c* using the time and frequency resources indicated by the discovery message 225. The UE 115-*a* may transmit the BTRS using one or more beams of the set of beams 210. The UE 115-*c* may monitor the BTRS using one or more receive beams. The UE 115-*c* may transmit a BTRS response signal. By communicating the BTRS, the UE 115-*a* and the UE 115-*c* may establish a beam pair for a corresponding unicast connection between the UE 115-*a* and the UE 115-*c*.

In some other implementations, the UE 115-*a* may transmit the BTRS to the UE 115-*c* prior to receiving the discovery response message from the UE 115-*c*. That is, after the time gap, the UE 115-*a* may transmit the BTRS via the indicated time and frequency resources and using one or more beams of the set of beams 210. The UE 115-*c* may transmit a BTRS response signal to the UE 115-*a*. By communicating the BTRS, the UE 115-*a* and the UE 115-*c* may establish a beam pair for a corresponding unicast connection between the UE 115-*a* and the UE 115-*c*. The UE 115-*c* may transmit a discovery response message to the UE 115-*a* after establishing the beam pair with the UE 115-*a*. As such, the UE 115-*c* may utilize the established beam pair to perform the discovery response message transmission, which may improve reliability and reduce overhead (instead of relaying the discovery response message via other UEs 115 before establishing the connection). However, transmitting the discovery response message after the beam training procedure may result in more latency than if the UE 115-*c* transmits the discovery response message prior to the beam training procedure.

Aspects of the described techniques may provide for the BS 105-*a* to transmit beam management parameters for a discovery and beam training procedure between two or more neighboring UEs 115. The beam management parameters may include time and frequency resources allocated for a beam sweeping procedure, a quantity of transmit beams that a transmitting UE 115 may use for the beam sweeping procedure, a type of the beam sweeping procedure, or any combination thereof. In some implementations, the BS 105-*a* may transmit a control message indicating a discovery configuration for a discovery and beam sweeping procedure between the UE 115-*a* and the UE 115-*b*. The control message may be transmitted via the communication links 220-*a* and 220-*b* using signaling, such as Layer 1 signaling, Layer 2 signaling, Layer 3 signaling, or any combination thereof. The Layer 3 signaling may define a set of options for the UE 115-*a* and the UE 115-*b*. The options may include the beam management parameters. The Layer 1 or Layer 2 signaling may be utilized by the BS 105-*a* to update the options.

The BS 105-*a* may transmit respective discovery configurations indicating beam management parameters to the UEs 115-*a*, 115-*b*, 115-*c*, and other UEs 115 that are within the geographic coverage area 110-*a*. However, the discovery configurations may not reach the UEs 115-*d* and 115-*e*, and other UEs 115 that are out of coverage of the BS 105-*a*. The UEs 115 that are out of coverage may receive a discovery configuration from other relay UEs 115 via sidelink communication links 215, such as PC5 interfaces. For example, the UE 115-*a* may relay a discovery configuration to the UE 115-*d* via the sidelink communication link 215-*c*. Additionally, or alternatively, the UEs 115 that are out of coverage may operate according to a configuration, such as a preconfiguration, for the UEs 115.

In some implementations of the described sidelink discovery and beam training procedures, a first UE 115, such as the UE 115-*a*, may broadcast the discovery message 225 over a set of beams 210 using a beam sweeping procedure, but the discovery message 225 may not be received by each other UE 115 in the group. For example, the UE 115-*c*, the UE 115-*e*, or some other UE 115 may not receive the discovery message 225 due to interference or pathloss. Additionally, or alternatively, the set of beams 210 may include a relatively large quantity of beams, such that the beam sweeping procedure may result in relatively high overhead. As such, techniques and configurations for forwarding a discovery message 225 may be beneficial.

The UEs 115 as described herein may be configured to forward the sidelink discovery message 225. That is, the UE 115-*a* may broadcast the sidelink discovery message 225 to each UE 115 that is connected to the UE 115-*a*, such as the UEs 115-*b* and 115-*d*. The UEs 115 that receive the discovery message 225 may forward the discovery message 225 to other UEs 115 until each UE 115 within a group or network receives the discovery message 225. For example, the UE 115-*d* may forward the discovery message 225 to the UE 115-*e* and the UE 115-*b* may forward the discovery message 225 to the UE 115-*c*. In some implementations, the discovery message 225 may indicate a time to live (TTL) parameter or a threshold quantity (a maximum quantity) of hops. The UEs 115 may forward the discovery message 225 until the TTL or the threshold quantity is reached. One or more of the UEs 115-*b*, 115-*c*, 115-*d*, and 115-*e* may transmit a discovery response message to the UE 115-*a* to indicate receipt of the discovery message 225. In some implementations, the UEs 115-*c* and 115-*e* may transmit the discovery response message to the UE 115-*a* via the UEs 115-*b* and 115-*d*, respectively.

In some implementations, the UE 115-*a* may transmit the discovery message 225 using one or more wide beams, which may not convey signals as far as narrower beams. As such, the one or more wide beams may not reach a UE 115 that is relatively far from the UE 115-*a*, such as the UE 115-*c*. Once the UE 115-*c* receives the forwarded discovery message 225 from the UE 115-*b*, the UE 115-*c* may transmit a discovery response message to the UE 115-*a* via the UE 115-*b*. The UE 115-*a* may use narrower beams of the set of beams 210 to communicate with the UE 115-*c*, such that the communications may reach the UE 115-*c*. For example, the UE 115-*a* may transmit BTRSs to the UE 115-*c* via narrower beams. The UE 115-*a* and the UE 115-*c* may perform the beam training procedure and set up a connection using the narrower beams.

Sidelink UEs 115 that operate at relatively high frequency bands, such as FR2, FR2x, FR4 may thereby perform sidelink discovery and a corresponding beam training procedure to set up a connection. The sidelink UEs 115 may be configured to forward discovery messages 225 to other UEs 115 to reduce overhead and improve coordination between devices. However, some techniques for forwarding sidelink discovery messages 225 may not specify how the discovery message 225 may be forwarded, what type of signaling may be used to forward the discovery message 225, or what type of information may be included in the discovery message 225.

Aspects of the described techniques may support a configuration for a UE 115 to ascertain, select or determine whether and how to forward a discovery message 225. Each UE 115 may be configured with one or more forwarding parameters 230. The UEs 115 may forward the discovery message 225 to one or more other UEs 115 when a condition associated with the one or more forwarding parameters 230 is satisfied. For example, the UE 115-*b* may receive the discovery message 225 from the UE 115-*a* and use the forwarding parameters 230 to ascertain, select or determine whether to forward the discovery message 225 to the UE 115-*c*.

In some implementations, the UE 115-*b* may utilize the forwarding parameters 230 to select one of a broadcast transmission or a unicast transmission for forwarding the discovery message 225. The forwarding parameters 230 may include a type of connection supported by the UE 115-*b*, an indication received via the discovery message 225, a configuration for the UE 115-*b*, a network status, or any combination thereof. The forwarding parameters 230 for ascertaining, selecting or determining whether to use a broadcast transmission, a unicast transmission, or both to forward a discovery message 225 are described in further detail elsewhere herein, including with reference to FIG. 3.

Additionally, or alternatively, the UE 115-*b* may utilize conditions associated with forwarding termination parameters included in the forwarding parameters 230 to ascertain, select or determine whether to forward the discovery message 225 to the UE 115-*c* or not. A condition associated with the forwarding termination parameters may correspond to an absence of an early termination message from the UE 115-*c*, an absence of a discovery response message from the UE 115-*c*, or both within a configured termination window. That is, if the UE 115-*b* does not receive an early termination message or a discovery response message, the UE 115-*b* will forward the discovery message 225. If the UE 115-*b* does receive an early termination message or a discovery response message, the UE 115-*b* will refrain from forwarding the discovery message 225 to the UE 115-*c*. The forwarding termination parameters are described in further detail elsewhere herein, including with reference to FIGS. 4A and 4B.

One or more UEs 115 may thereby support efficient sidelink discovery procedures by forwarding discovery messages 225 in accordance with one or more forwarding parameters 230. The UEs 115 may additionally, or alternatively, be configured to improve efficiency and communication reliability by conveying additional discovery information via a discovery message 225, a discovery response message, or both, which is described in further detail elsewhere herein, including with reference to FIGS. 5 and 6.

Figure 3:
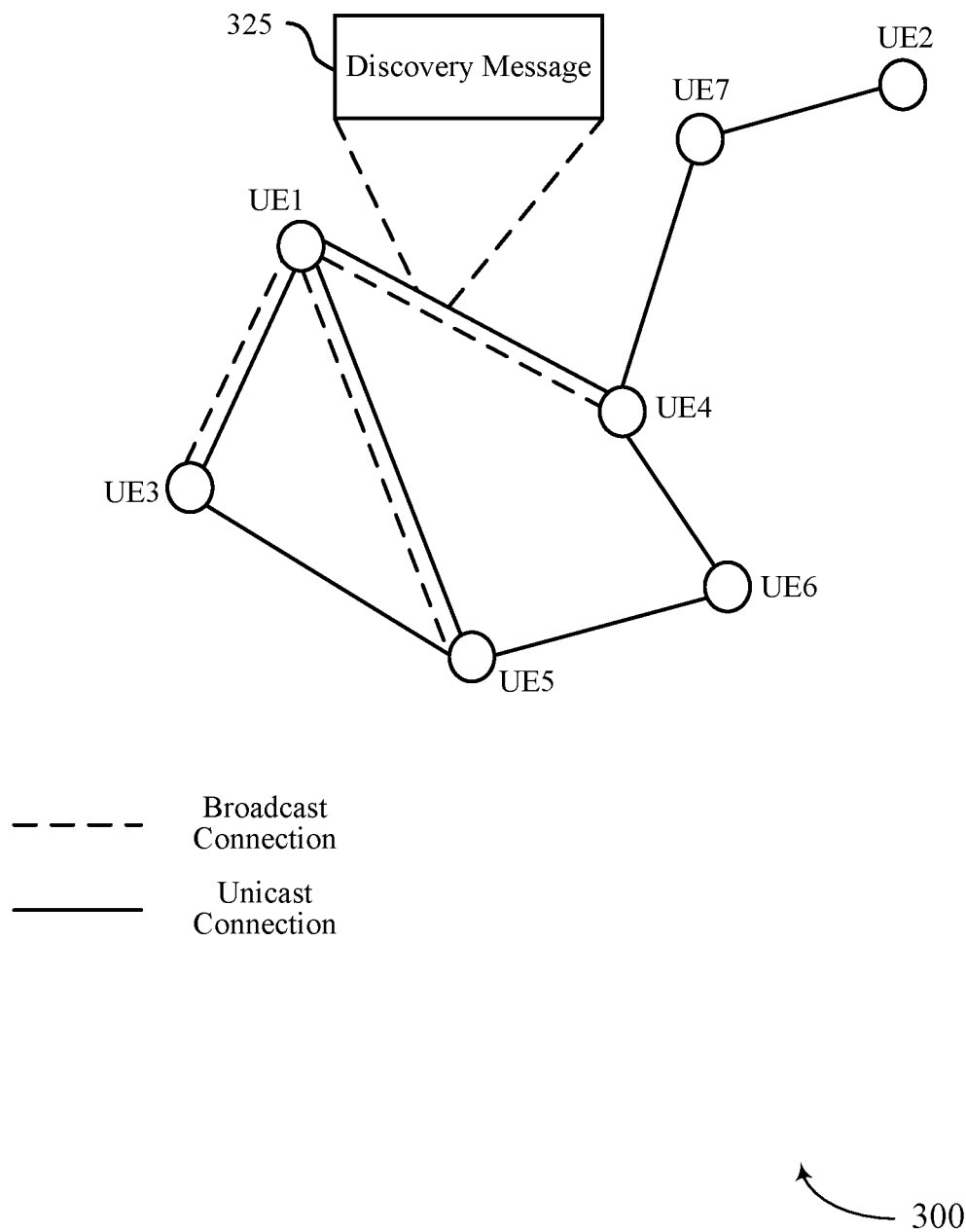
FIG. 3 illustrates an example of a discovery message forwarding procedure that supports sidelink discovery message forwarding.

FIG. 3 illustrates an example of a discovery message forwarding procedure 300 that supports sidelink discovery message forwarding. The discovery message forwarding procedure 300 may implement or be implemented by aspects of the wireless communications system 100 and the signaling diagram 200 described with reference to FIGS. 1 and 2. For example, the discovery message forwarding procedure 300 may illustrate an example procedure for forwarding discovery messages between a set of UEs 115. Each UE 115 may represent an example of a UE 115 as described herein, including with reference to FIGS. 1 and 2. In some implementations, a UE 115 may utilize one or more forwarding parameters associated with the respective UE 115 to ascertain, select or determine whether to forward a discovery message via a broadcast transmission or a unicast transmission.

Each of the UEs 115 illustrated in FIG. 3 may form a connected graph or group of UEs 115, and sidelink discovery may be performed within the group of UEs 115, as described with reference to FIG. 2. The UEs 115 may have existing unicast connections, as illustrated by the solid lines in FIG. 3, or broadcast connections, as illustrated by the dashed lines in FIG. 3, between one another. Each UE 115 may utilize a set of transmit and receive beams for communications. In some implementations, a connection between two UEs 115 may correspond to a respective beam pair that may be ascertained, selected or determined in accordance with a discovery and beam training procedure, as described with reference to FIG. 2. The UE1 may transmit a discovery message 325 to one or more of the other UEs 115 in the group. The discovery message 325 may be transmitted to each UE 115 via a broadcast transmission, a unicast transmission, or both.

In some implementations, the UE1 may broadcast the discovery message 325 to each UE 115 within the coverage area, such that each UE 115 illustrated in FIG. 3 receives the discovery message 325. In some implementations, however, the discovery message 325 may not reach each UE 115 in the group due to pathloss or interference, or the broadcast transmission may cause network congestion. For example, the UE2, the UE6, the UE7, or any combination thereof may not receive the discovery message 325. Alternatively, the discovery message 325 may be transmitted to each UE 115 in the group via existing unicast connections. However, forwarding the discovery message 325 via existing unicast connections may result in increased latency and overhead.

To improve reliability and reduce latency, the discovery message 325 may be transmitted to each UE 115 in the group via a combination of unicast and broadcast transmissions. For example, the UE1 may broadcast the discovery message 325. The broadcast transmission may be received by each of the UE3, the UE4, and the UE5, but may not be received by the UE2, the UE6, and the UE7 due to pathloss, interference, a type of beam used to perform the broadcast transmission, or any combination thereof. The UE3, the UE4, and the UE5 may each forward the discovery message 325 to other UEs 115 different than the UE1 using a unicast or broadcast transmission. In some implementations, some of the communication legs within the group of UEs 115 may be designated as broadcast links, and other communication legs may be designated as unicast links, as illustrated in FIG. 3.

Aspects of the described techniques may configure the UEs 115 with one or more parameters for ascertaining, selecting or determining whether to transmit or forward a discovery message 325 via a broadcast transmission or a unicast transmission. The parameters may represent an example of the forwarding parameters 230 described herein, including with reference to FIG. 2. The parameters may correspond to a type of connection supported by the UE 115, an indication received via the discovery message 325, a configuration for the UE 115, a network status, or any combination thereof. For example, a UE 115, such as the UE1, may broadcast the discovery message 325 if the UE1 does not support an existing unicast connection. That is, a UE 115 may forward the discovery message 325 using a unicast transmission unless the UE 115 does not have a unicast connection, in which case the UE 115 may forward the discovery message 325 using a broadcast transmission.

In some implementations, the UE1 may broadcast the discovery message 325 before the UE1 establishes the unicast connections with the UE3, the UE4, and the UE5. The UE4 and the UE5 may support existing unicast connections and may forward the discovery message 325 using the existing unicast connections. For example, the UE5 may forward the discovery message 325 to the UE6 via a unicast transmission, and the UE4 may forward the discovery message 325 to the UE7 via a unicast transmission. The UE7 may further forward the discovery message 325 to the UE2 via a unicast transmission.

Additionally, or alternatively, a discovery message 325 may indicate, to the UE 115, whether to use a broadcast transmission or a unicast transmission to transmit or forward the discovery message 325. For example, the discovery message 325 may include a field or information element that indicates one of a broadcast transmission or a unicast transmission. A receiving UE 115, such as the UE4, may forward the discovery message 325 via a broadcast transmission if the discovery message 325 indicates a broadcast transmission and may forward the discovery message 325 via a unicast transmission if the discovery message 325 indicates a unicast transmission. The indication in the discovery message 325 may be set by the UE1 that initially transmits the discovery message 325, by a network entity, such as a BS 105, or both.

In some implementations, a UE 115 may ascertain, select or determine whether to use a broadcast transmission or a unicast transmission to transmit or forward the discovery message 325 in accordance with a configuration for the UE 115. For example, a network entity may configure each UE 115 to support one of broadcast or unicast transmissions for discovery messages 325. In some implementations, the UE1 may be configured to broadcast the discovery message 325, and the UE4 may be configured to forward the discovery message 325 via a unicast transmission.

In some implementations, a UE 115 may ascertain, select or determine whether to use a broadcast transmission or a unicast transmission to transmit or forward the discovery message 325 based on a network status. That is, the UE 115 may ascertain, select or determine a portion of resources within one or more channels that have been previously used for transmissions, which may indicate a resource utilization within the network. In such implementations, the UE 115 may be configured to forward or transmit the discovery message 325 using a unicast transmission unless the network status is below a threshold level, which may indicate that the network is not busy. If the UE 115 ascertains or determines that the network status is below the threshold level, the UE 115 will forward or transmit the discovery message 325 using a broadcast transmission. The UE 115 may refrain from using broadcast transmissions if the network status is above the threshold level to reduce congestion and overhead within the network.

The techniques described herein may support configurations of forwarding parameters for each UE 115 to use to ascertain, select or determine whether to transmit or forward a discovery message 325 using a unicast transmission or a broadcast transmission.

Figure 4A:
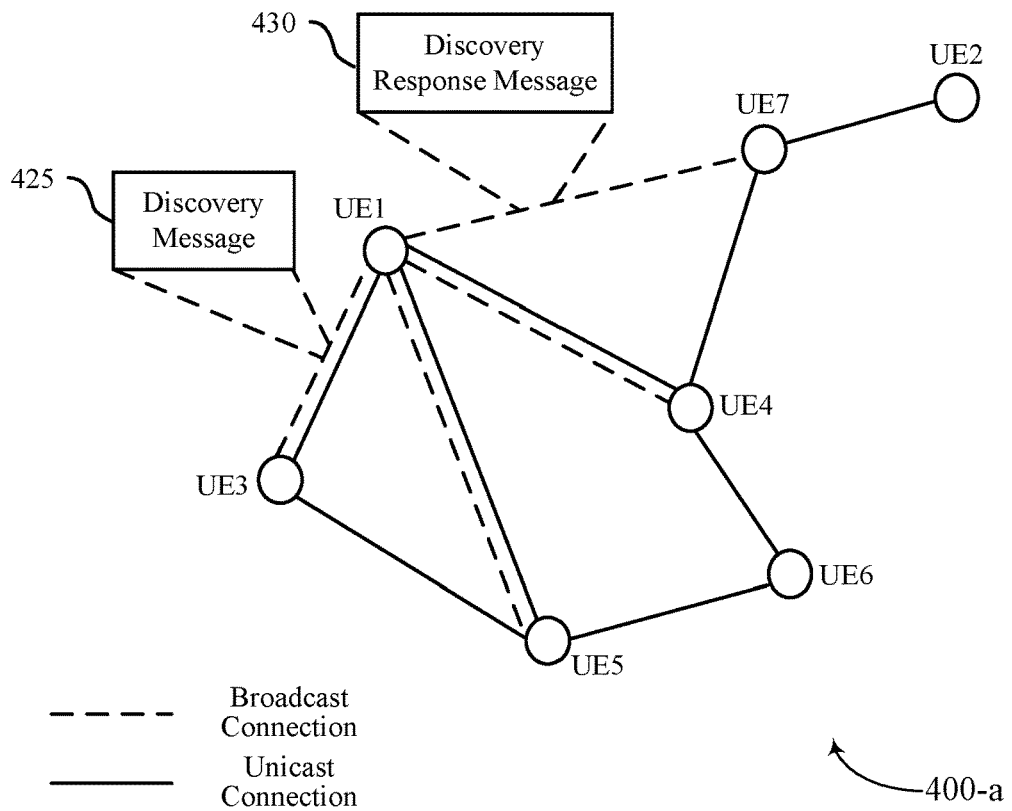
FIGS. 4A and 4B illustrate examples of discovery message forwarding procedures that support sidelink discovery message forwarding.
Figure 4B:
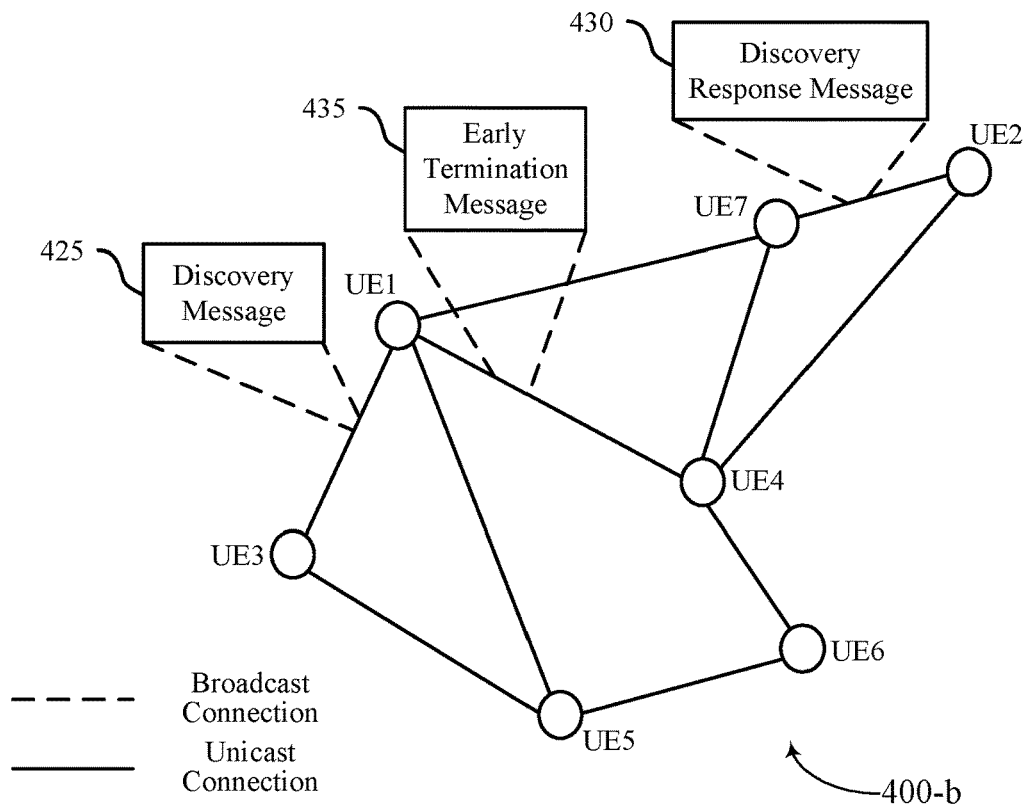

FIGS. 4A and 4B illustrate examples of discovery message forwarding procedures 400 that support sidelink discovery message forwarding. The discovery message forwarding procedures 400-*a* and 400-*b* may implement or be implemented by aspects of the wireless communications system 100 and the signaling diagram 200 described with reference to FIGS. 1 and 2. For example, the discovery message forwarding procedures 400-*a* and 400-*b* may illustrate example procedures for forwarding discovery messages 425 between a set of UEs 115. Each UE 115 may represent an example of a UE 115 as described herein, including with reference to FIGS. 1-3. In some implementations, a UE 115 may ascertain, select or determine whether to forward a discovery message 425 or not in accordance with a condition associated with one or more forwarding termination parameters.

Each UE 115 may utilize a set of transmit and receive beams for communications. In some implementations, a connection between two UEs 115 may correspond to a respective beam pair that may be ascertained, selected or determined in accordance with a discovery and beam training procedure, as described with reference to FIG. 2. In the example of FIGS. 4A and 4B, a UE 115 may forward a discovery message 425 using an existing unicast connection (illustrated by the solid lines in FIG. 4) or broadcast connection (illustrated by the dashed lines in FIG. 4) and corresponding beam pair. The UE 115 may utilize one or more forwarding parameters to ascertain, select or determine whether to forward the discovery message 425 using a unicast transmission or a broadcast transmission, as described with reference to FIG. 3. The UE 115 may refrain from forwarding the discovery message 425 to a second UE 115 from which the UE 115 receives the discovery message 425. In some implementations, a discovery message 425 may indicate one or more forwarding termination triggers, such as a quantity of hops or a TTL. The UEs 115 may refrain from forwarding the discovery message 425 once the quantity of hops or the TTL is reached to avoid unnecessary forwarding and reduce overhead.

If a discovery message 425 indicates one or more target UEs 115 that are intended to receive the discovery message 425, and each target UE 115 accurately receives and decodes the discovery message 425, other UEs 115 may be configured to refrain from forwarding the discovery message 425 to the target UEs 115. However, the discovery message 425 may, in some implementations, be broadcast throughout a network and may not indicate intended target UEs 115. Additionally, or alternatively, each intended target UE 115 may not receive and decode the discovery message 425. In such cases, a UE 115 may forward the discovery message 425 to another UE 115 that has already received the discovery message 425, which may provide for unnecessary power consumption and overhead.

Techniques described herein provide for one or more UEs 115 to be configured with forwarding termination parameters, a termination window, or both. The UEs 115 may ascertain, select or determine whether to forward a discovery message 425 to other UEs 115 based on a condition associated with the forwarding termination parameters and the termination window. By utilizing the forwarding termination parameters to ascertain, select or determine whether to forward the discovery message 425, the UEs 115 may refrain from forwarding the discovery message 425 to other UEs 115 that have already received the discovery message 425, which may reduce power consumption and overhead.

One or more UEs 115 may be configured with the termination window, which may be a delay period or gap between a first time at which the UE 115 receives a discovery message 425 and a second time at which the UE 115 ascertain, select or determines whether to forward the discovery message 425. The termination window may provide time for the UE 115 to identify whether the condition associated with the forwarding termination parameters is satisfied. The condition associated with the forwarding termination parameters may correspond to an absence or a presence of an early termination message 435 (which may be referred to as an explicit cancellation), an absence or a presence of a discovery response message 430 (which may be referred to as an implicit cancelation), or both within the configured termination window.

FIG. 4A illustrates an example discovery message forwarding procedure 400-a, in which a group of connected UEs 115 may ascertain, select or determine whether to forward a discovery message 425 based on an absence or presence of a discovery response message 430 (implicit cancelation). In the example of FIG. 4A, the UE1 may transmit a discovery message 425 to one or more other UEs 115 in the group of UEs 115. For example, the UE1 may broadcast the discovery message 425. The UE3, the UE4, the UE5, and the UE7 may receive the broadcast discovery message 425 from the UE1. A UE 115 that receives the discovery message 425 directly from the UE1 or via forwarding from other UEs 115 may send a discovery response message 430 to the UE1 via a unicast transmission, a broadcast transmission, or via other relay UEs 115.

The UE3, the UE4, the UE5, and the UE7 may be configured to forward the discovery message 425 to one or more neighboring UEs 115 using existing unicast connections and corresponding beams, such as narrow beams. However, one or more of the UE3, the UE4, the UE5, and the UE7 may be configured with respective termination windows for identifying whether a condition satisfies termination parameters configured for the respective UE 115 before forwarding the discovery message 425. In the example of FIG. 4A, the condition may correspond to an absence of a discovery response message 430 from neighboring UEs 115 within the termination window. That is, if the UE3, the UE4, the UE5, and the UE7 do not receive a discovery response message 430 from a neighboring UE 115 during the termination window, the UE3, the UE4, the UE5, and the UE7 may forward the discovery message 425. If the UE3, the UE4, the UE5, and the UE7 receive a discovery response message 430 during the termination window, the UE3, the UE4, the UE5, and the UE7 may refrain from forwarding the discovery message 425.

In some implementations, the UE7 may be a target UE 115 for the discovery message 425. The UE7 may transmit a discovery response message 430 to the UE1 in response to receiving the discovery message 425 via a broadcast transmission from the UE1. The UE7 may not have an existing unicast connection with the UE1. As such, the UE7 may transmit the discovery response message 430 to the UE1 via a broadcast transmission.

The UE4 may be configured with a respective termination window for identifying whether a condition satisfies the termination parameters before forwarding the discovery message 425 to neighboring UEs 115, such as the UE7. The UE4 may thereby wait for at least the duration of the termination window after receiving the discovery message 425 before forwarding the discovery message 425. During the duration of the termination window, the UE4 may receive the discovery response message 430 from the UE7 via the broadcast transmission. The UE4 may cancel the forwarding of the discovery message 425 to the UE7 in response to receiving the broadcast discovery response message 430.

In some implementations, the UE4 may receive the discovery response message 430 from the UE7, but the UE4 may not receive a discovery response message 430 from the UE6. The UE4 may forward the discovery message 425 to the UE6 in accordance with the absence of a discovery response message 430 from the UE6 during the termination window. Additionally, or alternatively, the UE4 may refrain from forwarding the discovery message 425 to any other UEs 115, including the UE6, in response to receiving the discovery response message 430 from the UE7 during the termination window.

The termination window may, in some implementations, increase latency as compared with discovery forwarding procedures in which a UE 115 forwards a discovery message 425 without waiting for the duration of the termination window. However, by ascertaining, selecting or determining whether to forward the discovery message 425 due to an absence or presence of a discovery response message 430 within the termination window, a UE 115 may refrain from forwarding the discovery message 425 to one or more UEs 115 that have already received the discovery message 425. Such techniques may reduce overhead, support power savings, and provide for more efficient utilization of resources.

FIG. 4B illustrates an example discovery forwarding procedure 400-*b*, in which a group of connected UEs 115 may ascertain, select or determine whether to forward a discovery message 425 due to an absence or presence of an early termination message 435, which also may be referred to as a cancellation message (explicit cancellation). In the example of FIG. 4B, the UE1 may transmit a discovery message 425 to one or more other UEs 115 in the group of UEs 115. For example, the UE1 may transmit the discovery message 425 to the UE3, the UE4, the UE5, and the UE7 via the respective unicast or broadcast connections.

A UE 115 that receives the discovery message 425 directly from the UE1 or via forwarding from other UEs 115 may send a discovery response message 430 to the UE1 via a unicast transmission, a broadcast transmission, or via other relay UEs 115. A UE 115 that receives the discovery message 425 may additionally, or alternatively, transmit an early termination message 435. In some implementations, if the UE1 receives a discovery response message 430 from another UE 115, the UE1 may broadcast an early termination message 435.

The UE3, the UE4, the UE5, and the UE7 may be configured to forward the discovery message 425 to one or more neighboring UEs 115 using existing unicast connections and corresponding beams, such as narrow beams. The UEs may each be configured with different rules or policies with respect to a forwarding timeline. For example, some of the UEs 115 may be configured with a termination window, which may correspond to delayed forwarding, and some of the UEs 115 may not be configured with the termination window, such that the UEs 115 may forward the discovery message 425 automatically. In the example of FIG. 4B, the UE7 may be configured to forward the discovery message 425 as soon as possible after receiving the discovery message 425 and in accordance with a processing time for the UE7. The UE4 may be configured to delay forwarding for a duration of a configured termination window.

The UE7 may thereby forward the discovery message 425 to the UE2 via the unicast connection. The UE2 may transmit a discovery response message 430 to the UE1 via the UE7 using a unicast transmission. The UE1 may be configured to transmit an early termination message 435 in response to receiving the discovery response message 430 from the UE2. The UE1 may transmit the early termination message 435 to one or more UEs 115 via respective unicast connections, or the UE1 may broadcast the early termination message 435. The UE3, the UE4, and the UE5 may receive the early termination message 435 from the UE1. If the UE3, the UE4, and the UE5 are configured with a termination window and the early termination message 435 is received within the termination window, the UE3, the UE4, and the UE5 may refrain from forwarding the discovery message 425. For example, the UE4 may refrain from forwarding the discovery message 425 to the UE2 via the unicast connection, which may reduce power consumption and overhead.

If any of the UE3, the UE4, and the UE5 are not configured to support delayed discovery forwarding, the respective UE(s) 115 may forward the discovery message 425 before receiving the early termination message 435. For example, if the UE4 is not configured with the termination window, or if the early termination message 435 is received by the UE4 after the termination window, the UE4 will forward the discovery message 425 to the UE2. In such cases, the UE2 may receive the discovery message 425 twice.

The termination window may, in some implementations, increase latency as compared with discovery forwarding procedures in which a UE forwards the discovery message 425 without waiting for the duration of the termination window. However, by ascertaining, selecting or determining whether to forward the discovery message 425 due to an absence or presence of an early termination message 435 within the termination window, a UE 115 may refrain from forwarding the discovery message 425 to UEs 115 that have already received the discovery message 425. Such techniques may reduce overhead, support power savings, and provide for more efficient utilization of resources.

A UE 115 may thereby ascertain, select or determine whether to forward a discovery message 425 in accordance with one or more forwarding termination parameters configured for the UE 115, a termination window, receipt of a discovery response message 430 from other UEs 115, receipt of an early termination message 435 from one or more other UEs 115, or any combination thereof. That is, the UE 115 may be configured with one or more rules for ascertaining, selecting or determining whether to forward a discovery message 425, and the one or more rules may provide for a balance between power savings associated with reduced discovery message 425 forwarding and latency associated with the termination window.

Figure 5:
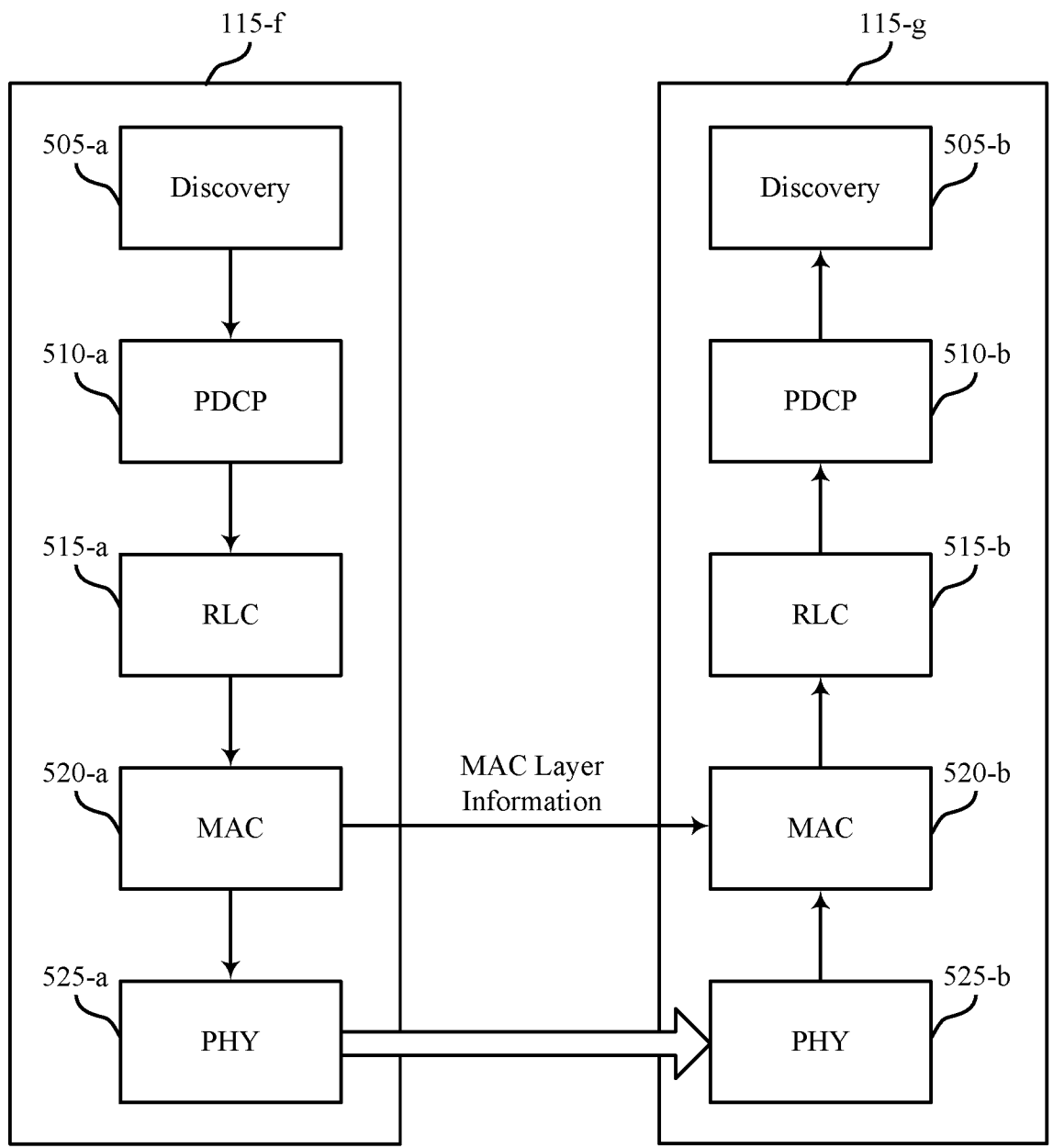
FIG. 5 illustrates an example of a protocol layer stack configuration that supports sidelink discovery message forwarding.

FIG. 5 illustrates an example of a protocol layer stack configuration 500 that supports sidelink discovery message forwarding. The protocol layer stack configuration 500 may illustrate example protocol layer stacks for a UE 115-*f* and a UE 115-*g*. The UEs 115-*f* and 115-*g* may each represent an example of a UE 115 as described herein, including with reference to FIGS. 1-4. One or more layers of the UEs 115-*f* and 115-*g* may generate a discovery message, a discovery response message, or both.

The UEs 115-*f* and 115-*g* may include respective application layers 505-*a* and 505-*b* (which may be referred to as discovery layers), packet data convergence protocol (PDCP) layers 510-*a* and 510-*b*, radio link control (RLC) layers 515-*a* and 515-*b*, MAC layers 520-*a* and 520-*b*, and physical (PHY) layers 525-*a* and 525-*b*. In the example of FIG. 5, the UE 115-*f* may transmit a discovery message to the UE 115-*g*, and the UE 115-*g* may transmit a discovery response message to the UE 115-*f* in response. The UE 115-*f* may generate and transmit the discovery message, or the UE 115-*f* may receive the discovery message from another UE 115 and forward the discovery message to the UE 115-*g*. The UE 115-*f* may be configured to include additional discovery information in the discovery message, and the UE 115-*g* may be configured to include additional discovery information in the discovery response message.

In some implementations, the discovery message generated and transmitted by the UE 115-*f* may include one or more fields or information elements configured to convey the additional discovery information, or signaling associated with the discovery message may convey the additional discovery information. The additional discovery information may indicate time and frequency resources for a beam training procedure, a location of the UE 115-*f*, mobility information associated with the UE 115-*f*, system information, information associated with a serving BS 105, a beam sweeping pattern, such as a BTRS pattern, for the beam training procedure, or any combination thereof. The location information may indicate a global positioning system (GPS) location of the UE 115-*f*. The UE 115-*g* may utilize the location information to point a receive or transmit beam in the direction of the UE 115-*f* during the sidelink discovery and beam training procedures. The mobility information may indicate whether the UE 115-*f* is moving or not, a speed at which the UE 115-*f* is moving, or both. The UE 115-*g* may utilize the mobility information of the UE 115-*f* to estimate a coherence time of a channel between the UE 115-*g* and the UE 115-*f*. The system information may indicate information transmitted to the UE 115-*f* from a serving BS 105. The information associated with the serving BS 105 may indicate an ID of the serving BS 105, an overhead associated with the serving BS 105, or both. The beam sweeping pattern may indicate one or more time and frequency resources that may be utilized for the BTRS beam sweeping operation.

If the UE 115-*f* receives the discovery message from another UE 115, the additional discovery information may be included in the discovery message or signaling associated with the discovery message before the UE 115-*f* forwards the discovery message to the UE 115-*g*. In such implementations, the additional discovery information may correspond to the other UE 115. Additionally, or alternatively, the UE 115-*f* may receive the discovery message from the other UE 115, and the UE 115-*f* may include or update the additional discovery information associated with the discovery message, for example, to correspond to the UE 115-*f* A receiving UE 115, such as the UE 115-*g*, may utilize the additional discovery information to improve a beam training procedure and sidelink communications with the UE 115-*f*, the other UE 115 that initially transmitted the discovery message, or both.

In some implementations, the discovery response message generated and transmitted by the UE 115-*g* may include one or more fields or information elements configured to indicate additional discovery information, or signaling associated with the discovery response message may indicate the additional discovery information. The additional discovery information may include a location of the UE 115-*g*, a quantity of beams supported by the UE 115-*g*, a reference signal received power (RSRP) of a demodulation reference signal (DMRS) received via the discovery message, or any combination thereof. The location information may indicate a GPS location of the UE 115-*g*. The UE 115-*f* may utilize the location information to point a receive or transmit beam in the direction of the UE 115-*g* during the sidelink discovery and beam training procedures.

The application layers 505, the MAC layers 520, the PHY layers 525, or any combination thereof of the UE 115-*f* and the UE 115-*g* may generate the discovery message and the discovery response message, respectively. For example, the application layer 505-*a* of the UE 115-*f* may generate the discovery message and extend the discovery message with an ID, such as an Application ID, of the target UE 115-*g* and location information of the source UE 115-*f*. Additionally, or alternatively, the application layer 505-*a* may provide the discovery message to the lower layers. One or more lower layers of the UE 115-*f*, such as the PHY layer 525-*a* or the MAC layer 520-*a*, or both, may generate or transmit the discovery message including the additional information. The discovery message may correspond to a logical channel ID (LCID), and the PHY layer 525-*a*, the MAC layer 520-*a*, or both, may generate the lower layer message information in accordance with a unique logical channel corresponding to the discovery message LCID.

The respective layers of the UE 115-*g* may perform similar operations to generate and transmit a discovery response message to the UE 115-*f*. For example, the application layer 505-*b* of the UE 115-*g* may generate the discovery message and extend the discovery response message with an ID, such as an Application ID, of the target UE 115-*f* and location information of the source UE 115-*g*. Additionally, or alternatively, the application layer 505-*b* may provide the discovery response message to the lower layers. One or more lower layers of the UE 115-*g*, such as the PHY layer 525-*b* or the MAC layer 520-*b*, or both, may generate or transmit the discovery response message including the additional discovery information in accordance with a unique logical channel corresponding to an LCID of the discovery response message.

In some implementations, signaling of the additional discovery information in the discovery message and the discovery response message may be based on the MAC layers 520-*a* and 520-*b* of the UEs 115-*f* and 115-*g*, respectively. That is, the additional discovery information may be signaled via MAC layer information. For example, the MAC layer 520-*a* of the UE 115-*f* may identify the discovery message based on the LCID. The MAC layer 520-*a* may add the additional discovery information to a MAC-CE and transmit the additional discovery information via the MAC-CE together with the discovery message. In some implementations, the MAC layer 520-*a* may optimize the transmission of the discovery message in accordance with available additional discovery information.

The MAC layer 520-*b* of the UE 115-*g* may similarly generate and transmit the discovery response message. The MAC layer 520-*b* may identify the discovery response message from the upper layers of the UE 115-*g* based on the LCID. The MAC layer 520-*b* may add the additional discovery information to a MAC-CE and transmit the additional discovery information via the MAC-CE and together with the discovery response message. In some implementations, the MAC layer 520-*b* may optimize the transmission of the discovery response message in accordance with the additional discovery information.

The MAC layer 520 of a UE 115 that receives a discovery message or a discovery response message may read the additional discovery information signaled via the MAC layer information and remove the additional discovery information prior to passing the discovery message or discovery response message to one or more upper layers of the UE 115, such as an application layer 505.

A discovery request or response message may thereby be generated and signaled in accordance with a MAC layer 520. The discovery request or response message may include additional discovery information generated by the MAC layer 520 that may improve coordination between devices, improve communication reliability, and improve beam training procedures for sidelink discovery. In some implementations, the discovery request or response message may be generated and signaled in accordance with a PHY layer 525. PHY layer signaling for sidelink discovery is described in further detail elsewhere herein, including with reference to FIG. 6.

Figure 6:
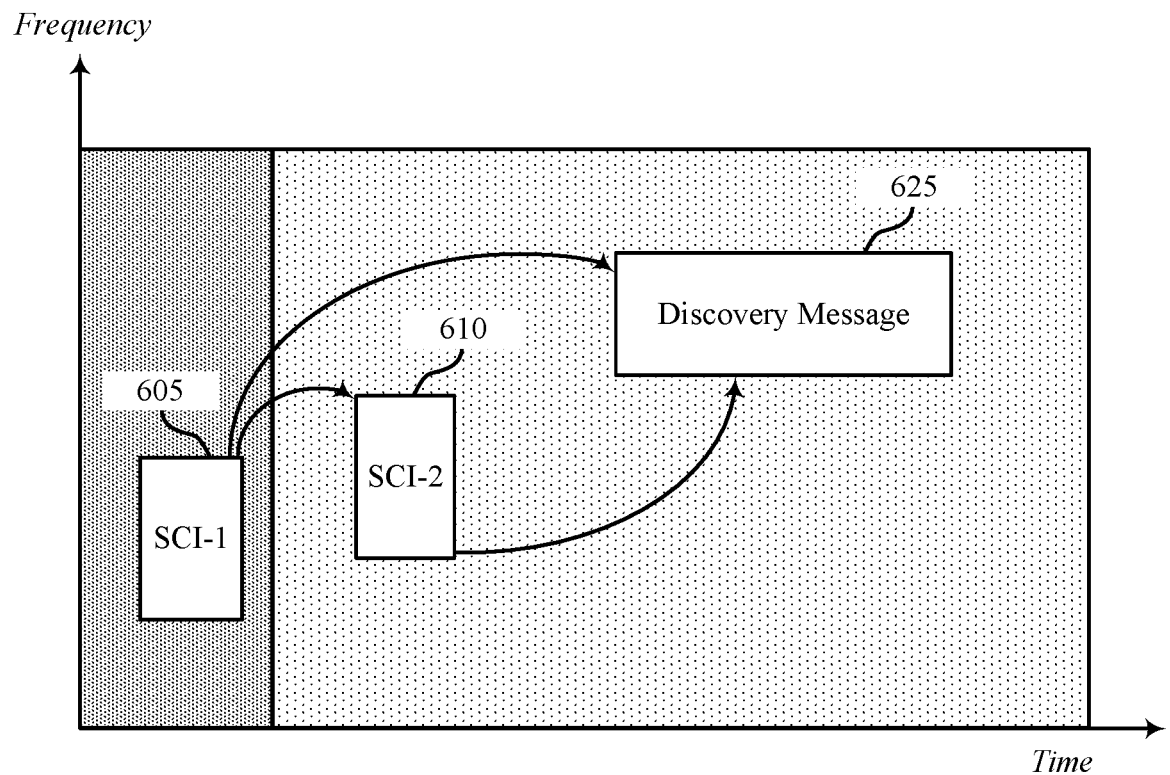
FIG. 6 illustrates an example of a discovery timeline that supports sidelink discovery message forwarding.
Figure 6:
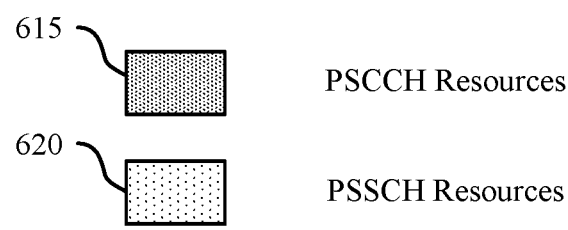

FIG. 6 illustrates an example of a discovery timeline 600 that supports sidelink discovery message forwarding. The discovery timeline 600 may illustrate example messages between one or more UEs 115 during a discovery procedure. The UEs 115 may represent examples of a UE 115 as described herein, including with reference to FIGS. 1-5. In the example of FIG. 6, a UE 115 may signal additional discovery information in accordance with a PHY layer of the UE 115. The PHY layer may represent an example of the PHY layers 525 as described with reference to FIG. 5. The additional discovery information may be an example of the additional discovery information described with reference to FIG. 5.

The UE 115 may transmit first stage SCI 605 (SCI-1) via one or more physical sidelink control channel (PSCCH) resources 615 to schedule transmission of a discovery message 625 or a discovery response message. The first stage SCI 605 may include information pertaining to a second stage SCI 610 (SCI-2), such as a resource allocation for the second stage SCI 610, information for decoding the second stage SCI 610, or both. The UE 115 may transmit the second stage SCI 610 via one or more physical sidelink shared channel (PSSCH) resources 620. The one or more PSSCH resources 620 may be indicated via the first stage SCI 605. The second stage SCI 610 may include information for decoding a corresponding data message transmitted via PSSCH resources, such as the discovery message 625 or a discovery response message. In some implementations, one or more UEs 115 may not support the second stage SCI 610, and the one or more UEs 115 may use the first stage SCI 605 to identify the PSSCH resources allocated for the discovery message 625.

Techniques described herein may provide for the second stage SCI 610 to convey additional discovery information associated with the discovery message 625 in accordance with a PHY layer of the UE 115, which may be referred to as a transmitting UE 115. A receiving UE 115 may receive the first stage SCI 605 that schedules the discovery message 625, and the receiving UE 115 may monitor the PSSCH resources 620 for the second stage SCI 610. The second stage SCI 610 may convey the additional discovery information corresponding to the discovery message 625. The receiving UE 115 may utilize the additional discovery information to establish a sidelink connection with the transmitting UE 115, as described with reference to FIG. 5. In some implementations, a PHY layer of the transmitting UE 115 may generate and transmit the additional discovery information via the second stage SCI 610. A PHY layer of the receiving UE 115 may receive the additional discovery information and remove the additional discovery information before forwarding the discovery message 625 to one or more upper layers of the receiving UE 115.

A discovery message 625 may thereby be generated and signaled in accordance with a PHY layer of a UE 115. The PHY layer may generate and transmit additional discovery information corresponding to the discovery message 625 via SCI (second stage SCI 610, first stage SCI 605, or both). Although a discovery message 625 is illustrated in FIG. 6, it is to be understood that the second stage SCI 610 may alternatively correspond to a discovery response message, and the second stage SCI 610 may convey additional discovery information associated with the discovery response message. The additional discovery information may improve coordination between devices, improve communication reliability, and improve beam training procedures for sidelink discovery.

Figure 7:
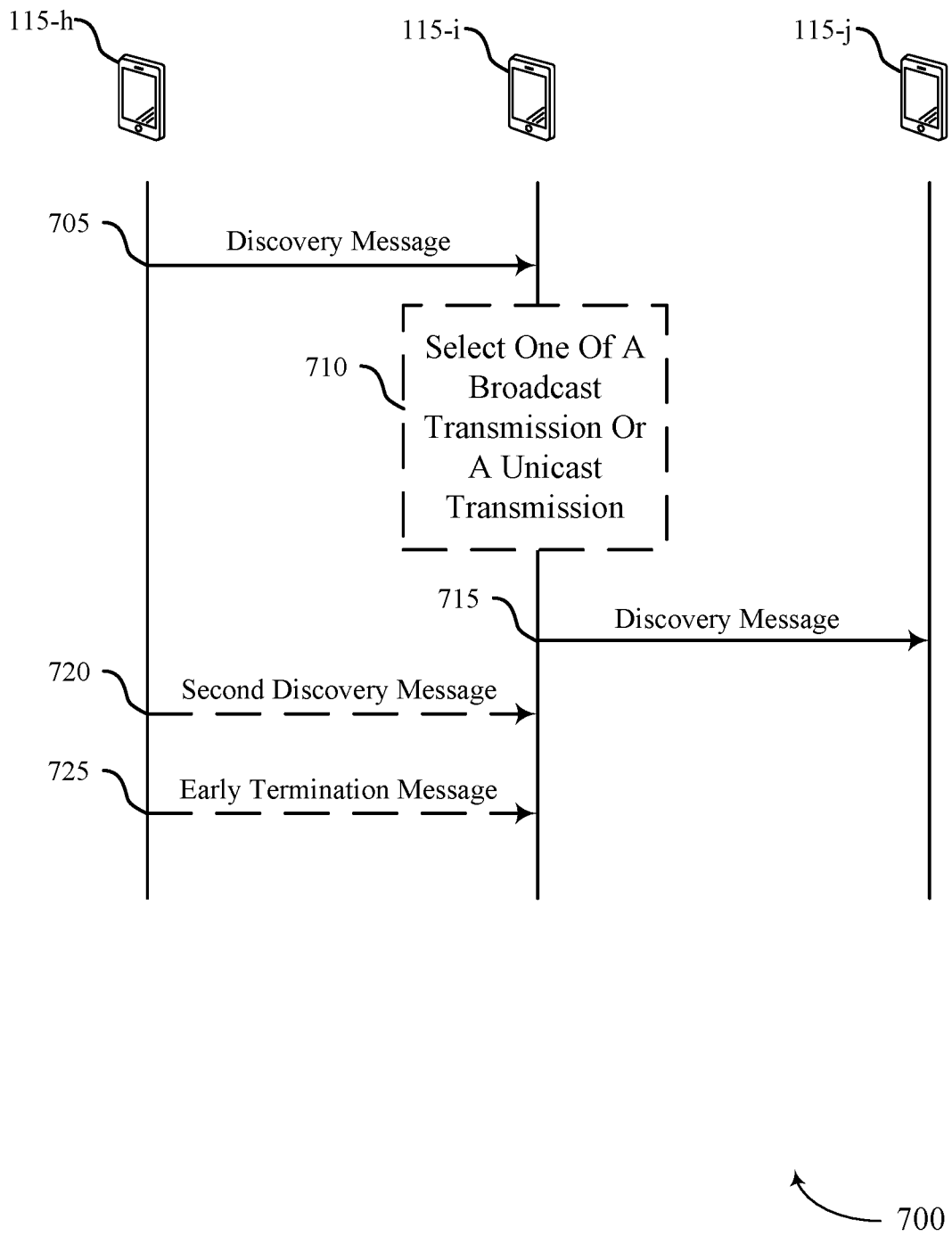
FIG. 7 illustrates an example of a process flow that supports sidelink discovery message forwarding.

FIG. 7 illustrates an example of a process flow 700 that supports sidelink discovery message forwarding. In some implementations, the process flow 700 may implement or be implemented by aspects of the wireless communications system 100 and the signaling diagram 200 described with reference to FIGS. 1 and 2. For example, the process flow 700 illustrates communication between a UE 115-*h*, a UE 115-*i*, and a UE 115-*j*, which may each represent examples of the UEs 115 described herein, including with reference to FIGS. 1-6. In some implementations, the UE 115-*i* may ascertain, select or determine whether to forward a discovery message from the UE 115-*h* to the UE 115-*j*.

In the following description of the process flow 700, the operations may be performed (for example, reported or provided) in a different order than the order shown, or the operations performed by the UE 115-*h*, the UE 115-*i*, and the UE 115-*j* may be performed in different orders or at different times. For example, specific operations also may be left out of the process flow 700, or other operations may be added to the process flow 700. Further, although some operations or signaling may be shown to occur at different times for discussion purposes, these operations may actually occur at the same time.

At 705, the UE 115-*i* may receive a discovery message from the UE 115-*h*. The discovery message may be part of a beam training procedure between the UE 115-*i* and the UE 115-*h*. In some implementations, the UE 115-*i* may forward the discovery message to one or more other UEs 115 when a condition associated with one or more forwarding termination parameters is satisfied. The condition being satisfied may correspond to an absence of an early termination message, an absence of a discovery response message or both, within a termination window.

At 710, in some implementations, the UE 115-*i* may select one of a broadcast transmission or a unicast transmission for transmitting the discovery message based on one or more parameters associated with the UE 115-*i*. The one or more parameters may include a type of connection supported by the UE 115-*i*, an indication of the one of the broadcast transmission or the unicast transmission received via the discovery message, a configuration for the UE 115-*i*, a status of a network that includes the UE 115-*i*, or any combination thereof.

At 715, the UE 115-*i* may transmit the discovery message to one or more other UEs 115 including the UE 115-*j* when the condition associated with the one or more forwarding termination parameters is satisfied. The UE 115-*i* may transmit the discovery message to the UE 115-*j* via a unicast transmission or to the UE 115-*j* and one or more other UEs 115 via a broadcast transmission in accordance with the one or more parameters and the selecting at 710.

At 720, in some implementations, the UE 115-*i* may receive a second discovery message from the UE 115-*h*. At 725, in some implementations, the UE 115-*i* may receive an early termination message from the UE 115-*h* (or the UE 115-*j*). The UE 115-*i* may additionally, or alternatively, receive a discovery response message from the UE 115-*j* or the UE 115-*j*. The UE 115-*i* may refrain from forwarding the second discovery message due to a condition associated with the one or more forwarding termination parameters being unsatisfied, where the condition being unsatisfied may correspond to the presence of the early termination message or the presence of the discovery response message within the termination window.

Figure 8:
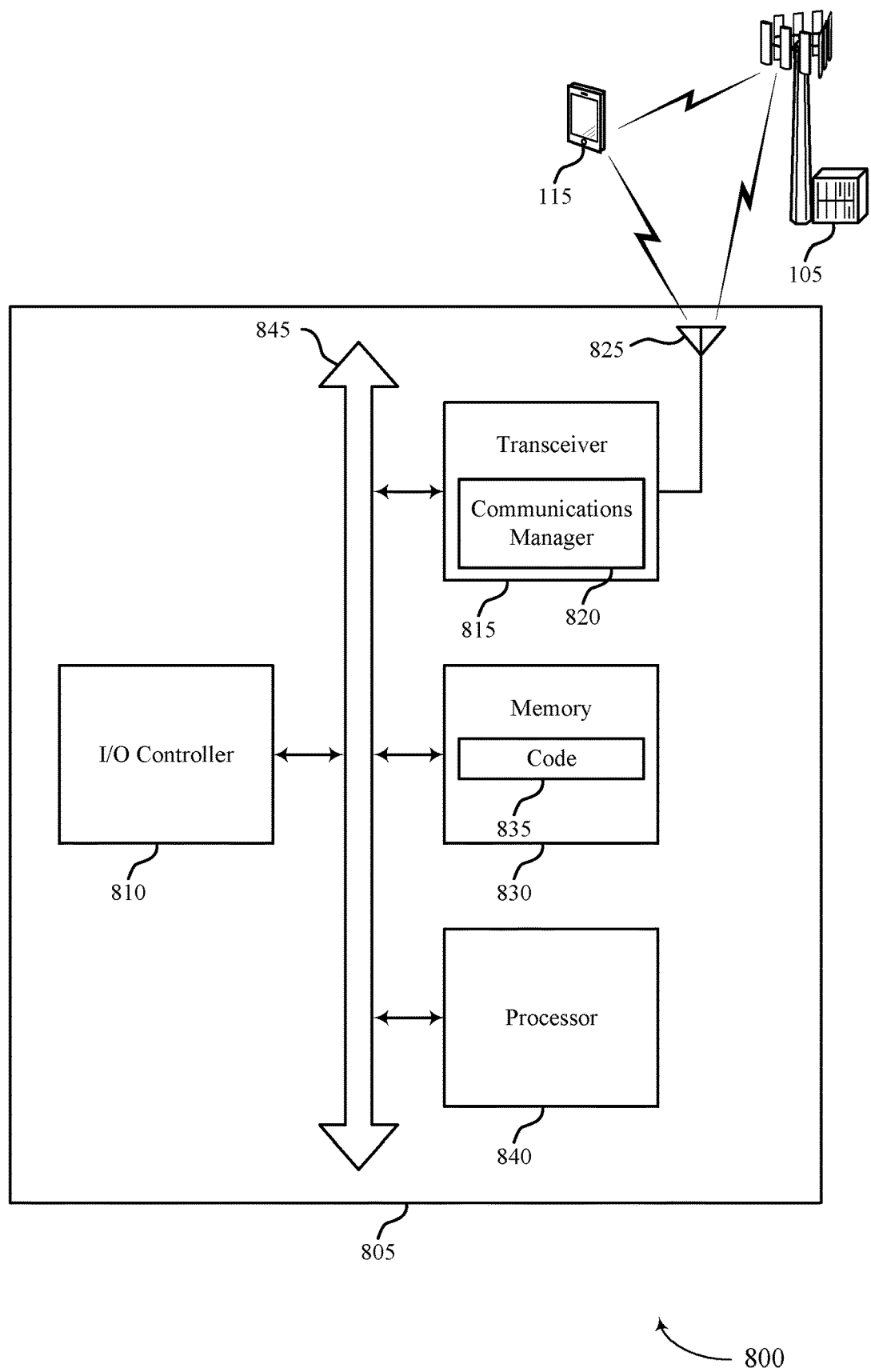
FIG. 8 shows a diagram of a system including a device that supports sidelink discovery message forwarding.

FIG. 8 shows a diagram of a system 800 including a device 805 that supports sidelink discovery message forwarding. The device 805 may communicate wirelessly with one or more BSs 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (operatively, communicatively, functionally, electronically, electrically) via one or more buses, such as a bus 845.

The I/O controller 810 may manage input and output signals for the device 805. The I/O controller 810 also may manage peripherals not integrated into the device 805. In some implementations, the I/O controller 810 may represent a physical connection or port to an external peripheral. In some implementations, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some implementations, the I/O controller 810 may be implemented as part of a processor or processing system, such as the processor 840. In some implementations, a user may interact with the device 805 via the I/O controller 810 or via hardware components controlled by the I/O controller 810.

In some implementations, the device 805 may include a single antenna 825. However, in some other implementations, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 also may include a modem to modulate the packets, to provide the modulated packets to one or more antennas 825 for transmission, and to demodulate packets received from the one or more antennas 825. In some implementations, the transceiver 815 may include one or more interfaces, such as one or more interfaces coupled with the one or more antennas 825 that are configured to support various receiving or obtaining operations, or one or more interfaces coupled with the one or more antennas 825 that are configured to support various transmitting or outputting operations, or a combination thereof. In some implementations, the transceiver 815 may include or be configured for coupling with one or more processors or memory components that are operable to perform or support operations based on received or obtained information or signals, or to generate information or other signals for transmission or other outputting, or any combination thereof. In some implementations, the transceiver 815, or the transceiver 815 and the one or more antennas 825, or the transceiver 815 and the one or more antennas 825 and one or more processors or memory components (for example, the processor 840, or the memory 830, or both), may be included in a chip or chip assembly that is installed in the device 805.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some implementations, the code 835 may not be directly executable by the processor 840 but may cause a computer (for example, when compiled and executed) to perform functions described herein. In some implementations, the memory 830 may contain, among other things, a basic I/O system (BIOS) which may control basic hardware or software operation such as the interaction with peripheral components or devices.

The processor 840 may be any one or more suitable processors capable of executing scripts or instructions of one or more software programs stored in the device 805 (such as within the memory 830). In some implementations, the processor 840 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 840, or the transceiver 815, or the communications manager 820, or other components or combinations of components of the device 805. The processing system of the device 805 may interface with other components of the device 805, and may process information received from other components (such as inputs or signals) or output information to other components. For example, a chip or modem of the device 805 may include a processing system, a first interface to output information, and a second interface to obtain information. In some implementations, the first interface may refer to an interface between the processing system of the chip or modem and a transmitter, such that the device 805 may transmit information output from the chip or modem. In some implementations, the second interface may refer to an interface between the processing system of the chip or modem and a receiver, such that the device 805 may obtain information or signal inputs, and the information may be passed to the processing system. A person having ordinary skill in the art will readily recognize that the first interface also may obtain information or signal inputs, and the second interface also may output information or signal outputs.

The communications manager 820 may support wireless communication at a first UE in accordance with examples as disclosed herein. For example, the communications manager 820 may be configured as or otherwise support a means for receiving, from a second UE, a discovery message of a beam training procedure between the first UE and the second UE. The communications manager 820 may be configured as or otherwise support a means for transmitting the discovery message from the second UE to the one or more other UEs when a condition associated with one or more forwarding termination parameters is satisfied.

Additionally, or alternatively, the communications manager 820 may support wireless communication at a third UE in accordance with examples as disclosed herein. For example, the communications manager 820 may be configured as or otherwise support a means for receiving, from a first UE, a discovery message of a beam training procedure between the first UE and a second UE, where the discovery message is associated with one or more forwarding termination parameters being satisfied. The communications manager 820 may be configured as or otherwise support a means for transmitting, to at least the first UE, the second UE, or both, a discovery response message based on the discovery message.

In some implementations, the communications manager 820 may be configured to perform various operations (for example, receiving, monitoring, transmitting) using or otherwise in cooperation with the transceiver 815, the one or more antennas 825, or any combination thereof. Although the communications manager 820 is illustrated as a separate component, in some implementations, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of sidelink discovery message forwarding as described herein, or the processor 840 and the memory 830 may be otherwise configured to perform or support such operations.

Figure 9:
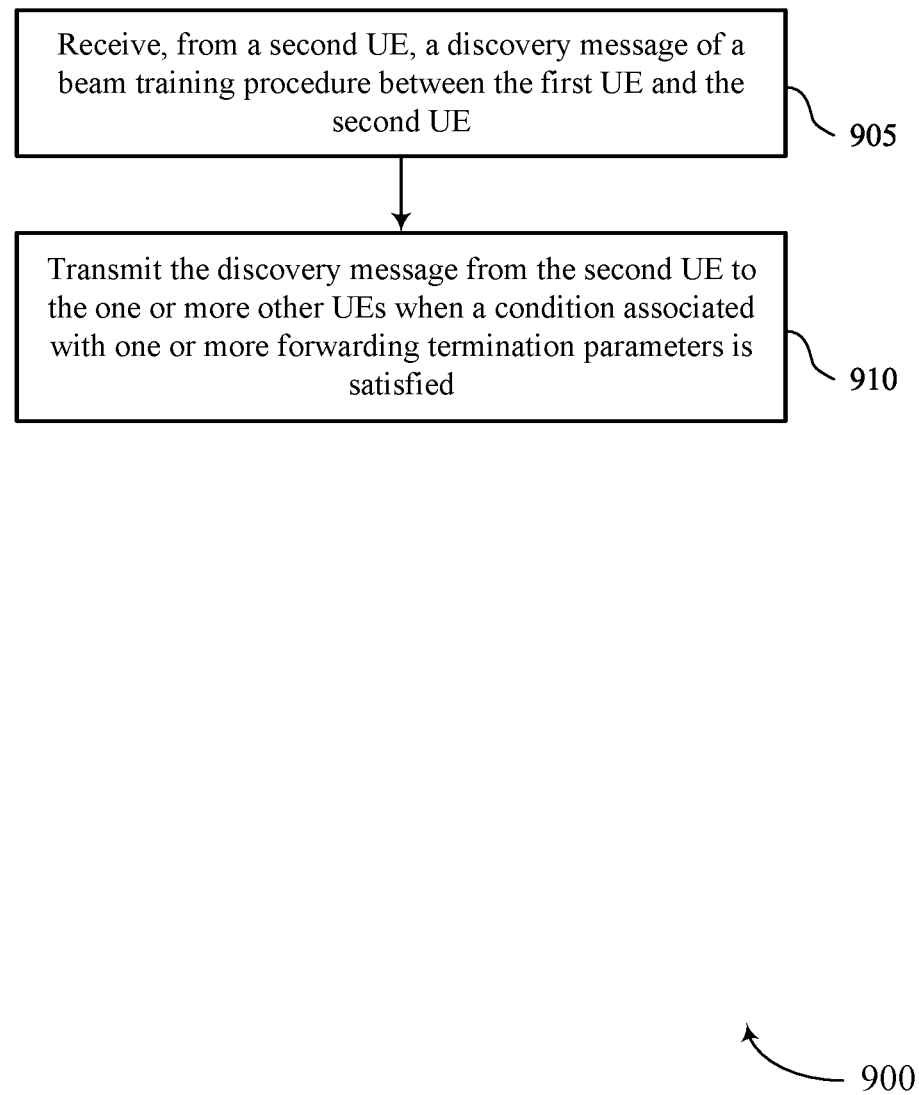
FIGS. 9-12 show flowcharts illustrating methods that support sidelink discovery message forwarding.

FIG. 9 shows a flowchart illustrating a method 900 that supports sidelink discovery message forwarding. The operations of the method 900 may be implemented by a UE or its components as described herein. For example, the operations of the method 900 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 905, the method may include receiving, from a second UE, a discovery message of a beam training procedure between the first UE and the second UE. The operations of 905 may be performed in accordance with examples as disclosed herein.

At 910, the method may include transmitting the discovery message from the second UE to the one or more other UEs when a condition associated with one or more forwarding termination parameters is satisfied. The operations of 910 may be performed in accordance with examples as disclosed herein.

Figure 10:
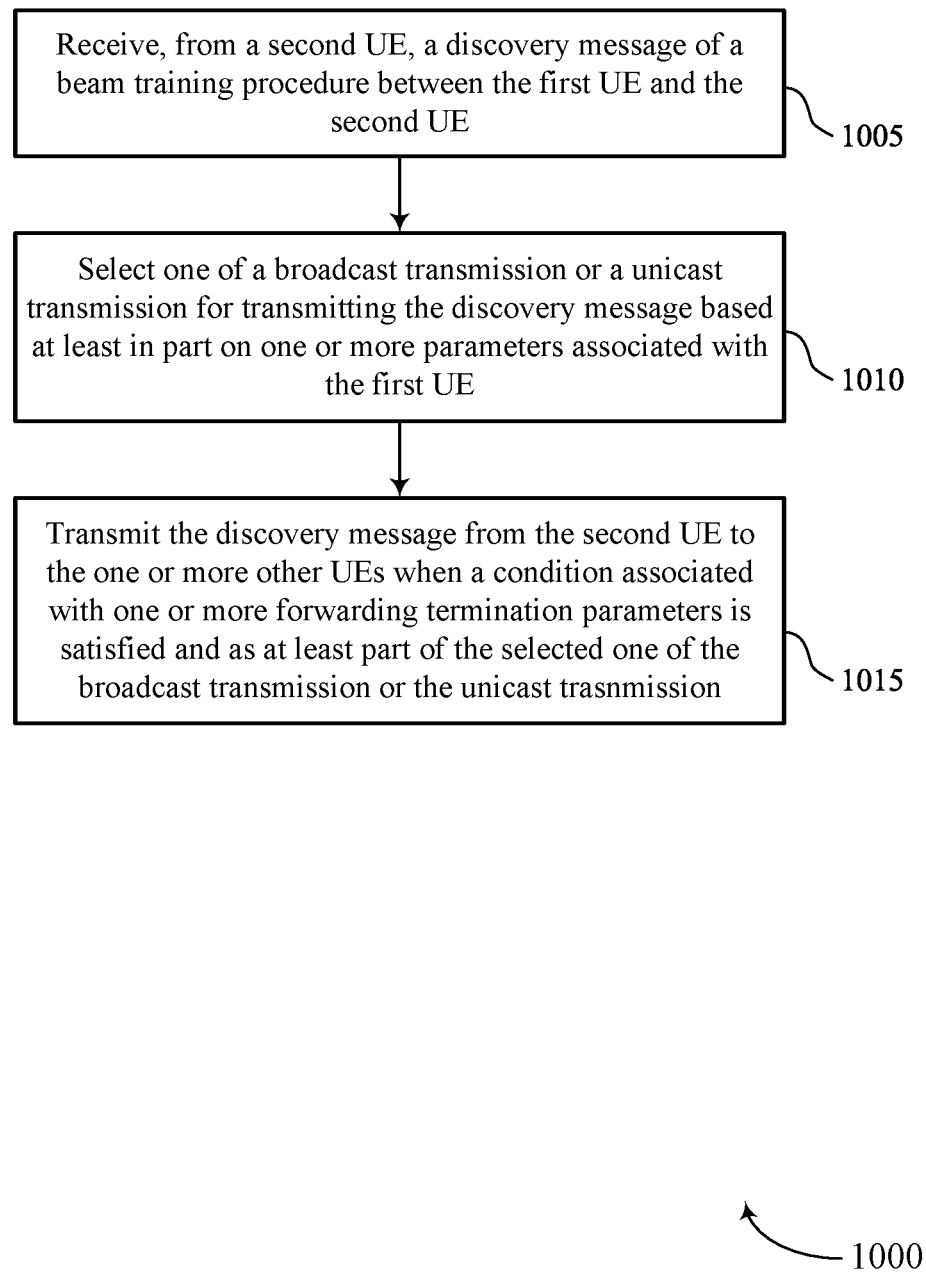

FIG. 10 shows a flowchart illustrating a method 1000 that supports sidelink discovery message forwarding. The operations of the method 1000 may be implemented by a UE or its components as described herein. For example, the operations of the method 1000 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1005, the method may include receiving, from a second UE, a discovery message of a beam training procedure between the first UE and the second UE. The operations of 1005 may be performed in accordance with examples as disclosed herein.

At 1010, the method may include selecting one of a broadcast transmission or a unicast transmission for transmitting the discovery message based on one or more parameters associated with the first UE. The operations of 1010 may be performed in accordance with examples as disclosed herein.

At 1015, the method may include transmitting the discovery message from the second UE to the one or more other UEs when a condition associated with one or more forwarding termination parameters is satisfied and as at least a part of the selected one of the broadcast transmission or the unicast transmission. The operations of 1015 may be performed in accordance with examples as disclosed herein.

Figure 11:
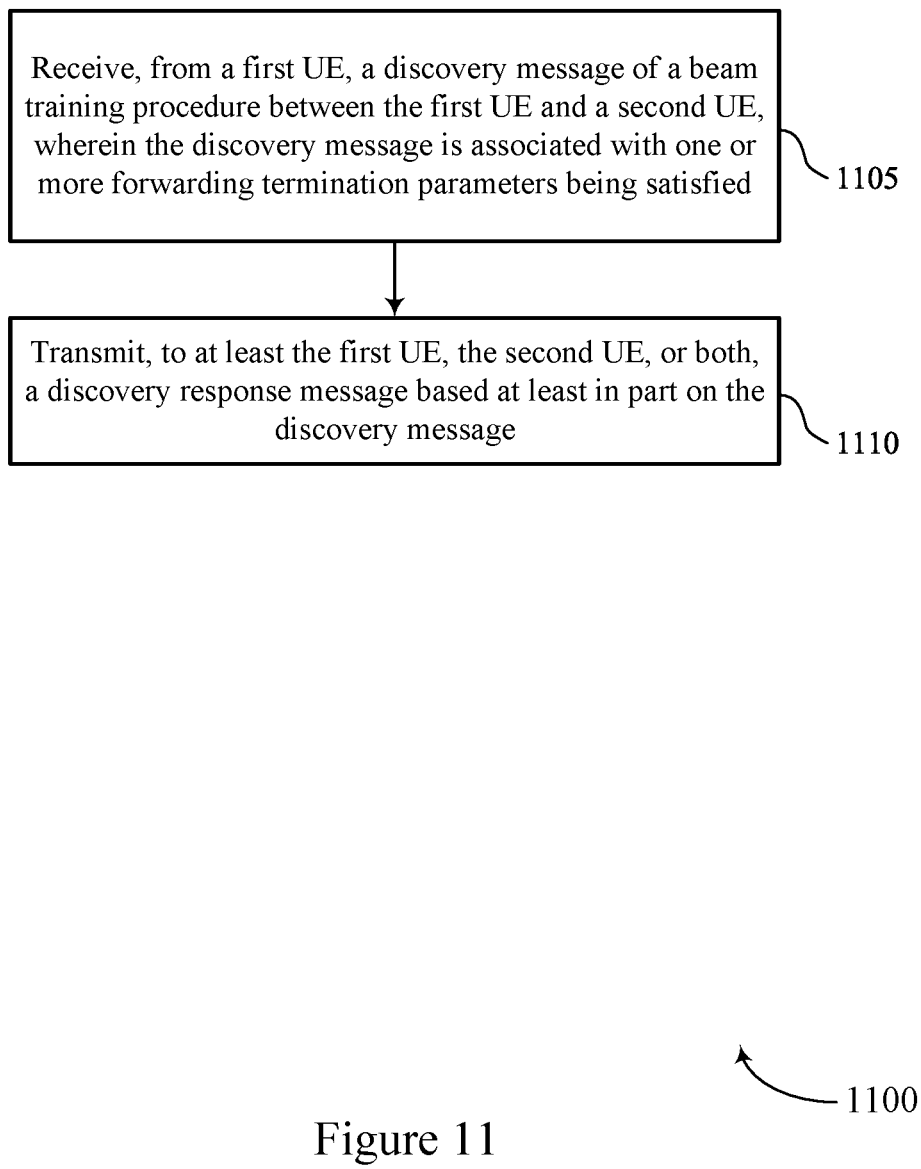

FIG. 11 shows a flowchart illustrating a method 1100 that supports sidelink discovery message forwarding. The operations of the method 1100 may be implemented by a UE or its components as described herein. For example, the operations of the method 1100 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1105, the method may include receiving, from a first UE, a discovery message of a beam training procedure between the first UE and a second UE, where the discovery message is associated with one or more forwarding termination parameters being satisfied. The operations of 1105 may be performed in accordance with examples as disclosed herein.

At 1110, the method may include transmitting, to at least the first UE, the second UE, or both, a discovery response message based on the discovery message. The operations of 1110 may be performed in accordance with examples as disclosed herein.

Figure 12:
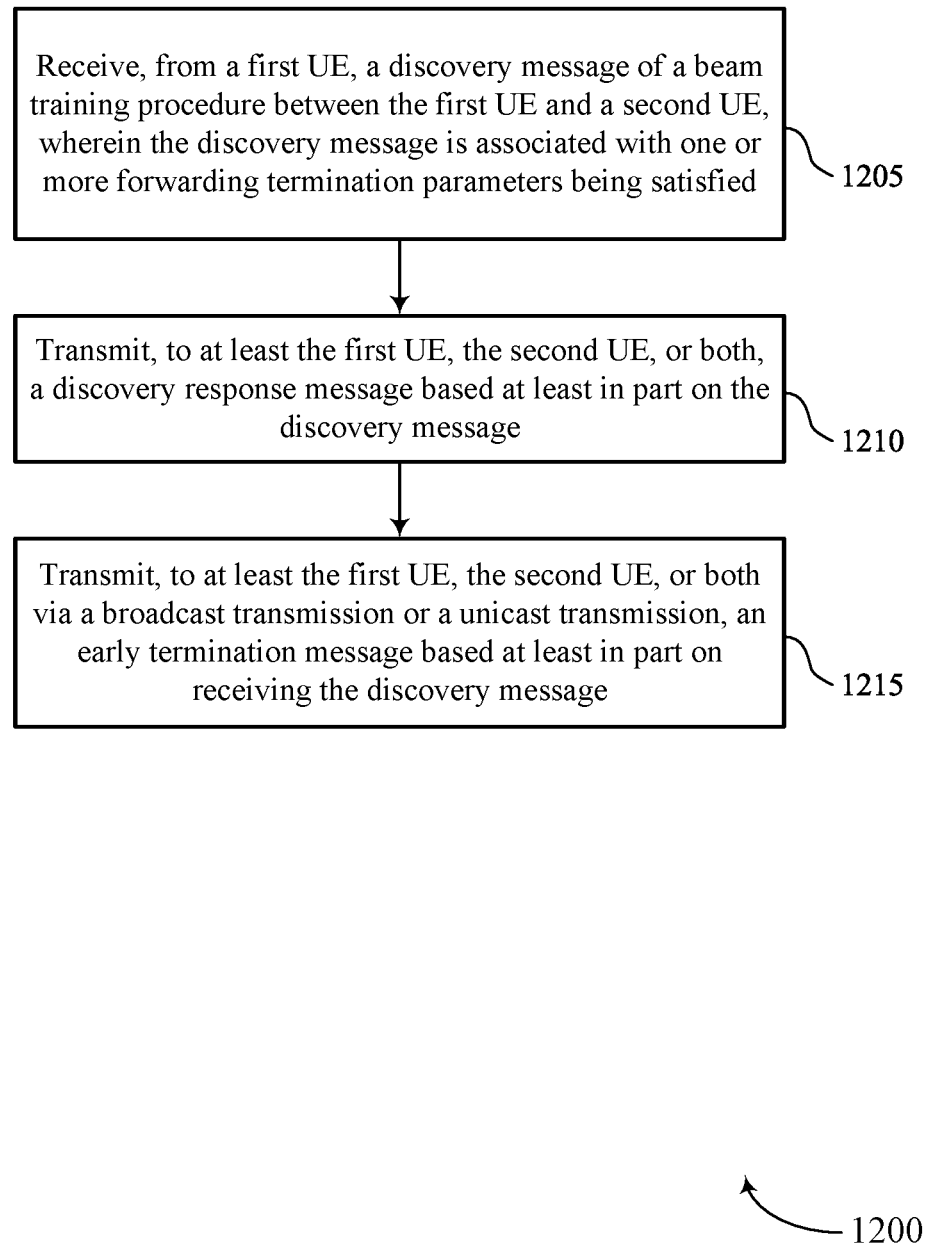

FIG. 12 shows a flowchart illustrating a method 1200 that supports sidelink discovery message forwarding. The operations of the method 1200 may be implemented by a UE or its components as described herein. For example, the operations of the method 1200 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1205, the method may include receiving, from a first UE, a discovery message of a beam training procedure between the first UE and a second UE, where the discovery message is associated with one or more forwarding termination parameters being satisfied. The operations of 1205 may be performed in accordance with examples as disclosed herein.

At 1210, the method may include transmitting, to at least the first UE, the second UE, or both, a discovery response message based on the discovery message. The operations of 1210 may be performed in accordance with examples as disclosed herein.

At 1215, the method may include transmitting, to at least the first UE, the second UE, or both via a broadcast transmission or a unicast transmission, an early termination message based on receiving the discovery message. The operations of 1215 may be performed in accordance with examples as disclosed herein.

The following provides an overview of some aspects of the present disclosure:

Aspect 1: An apparatus for wireless communications, including: a processing system, a first interface configured to obtain for a first user equipment (UE) and from a second UE, a discovery message of a beam training procedure between the first UE and the second UE; and the first interface or a second interface configured to output the discovery message from the second UE to the one or more other UEs when a condition associated with one or more forwarding termination parameters is satisfied.

Aspect 2: The apparatus of aspect 1, where the processing system is further configured to: select one of a broadcast transmission or a unicast transmission for transmitting the discovery message based at least in part on one or more parameters associated with the first UE; and the first interface or the second interface is further configured to: output the discovery message to the one or more other UEs as at least a part of the selected one of the broadcast transmission or the unicast transmission.

Aspect 3: The apparatus of aspect 2, where the one or more parameters associated with the first UE include a type of connection supported by the first UE, an indication of the one of the broadcast transmission or the unicast transmission received via the discovery message, a configuration for the first UE, a status of a network that includes the first UE, or any combination thereof.

Aspect 4: The apparatus of any of aspects 1 through 3, where the condition being satisfied corresponds to an absence of an early termination message, a discovery response message, or both, within a termination window.

Aspect 5: The apparatus of any of aspects 1 through 4, where the first interface is configured to: obtain a second discovery message; and the processing system is further configured to: refrain from forwarding the second discovery message based at least in part on the condition being unsatisfied.

Aspect 6: The apparatus of aspect 5, where the first interface is further configured to: obtain an early termination message or a discovery response message within a termination window, where the condition being unsatisfied corresponds to receiving the early termination message or the discovery response message.

Aspect 7: The apparatus of any of aspects 1 through 6, where the discovery message indicates discovery information including a set of time and frequency resources for the beam training procedure, a location of the second UE, mobility information associated with the second UE, system information, information associated with a serving base station, a beam sweeping pattern for the beam training procedure, or any combination thereof.

Aspect 8: The apparatus of aspect 7, where: the first interface is further configured to: obtain the discovery message at a physical layer of the first UE; and the first interface or the second interface is further configured to: output, from the physical layer of the first UE, a discovery response message to the second UE, where the discovery response message is based at least in part on the discovery information, and where the discovery information is identified at a medium access control (MAC) layer of the first UE.

Aspect 9: The apparatus of any of aspects 7 through 8, where the first interface is further configured to: obtain, from the second UE via a physical sidelink shared channel (PSSCH), a sidelink control information (SCI) message including the discovery information.

Aspect 10: The apparatus of any of aspects 1 through 9, where: the processing system is further configured to: generate a discovery response message by one or both of an application layer of the first UE or a physical layer of the first UE; and the first interface or the second interface is further configured to: output, to the second UE, the discovery response message based at least in part on receiving the discovery message, where the discovery response message indicates a location of the first UE, a number of beams supported by the first UE, a reference signal received power (RSRP) of a demodulation reference signal (DMRS) of the discovery message, or any combination thereof.

Aspect 11: The apparatus of any of aspects 1 through 10, where the first interface is further configured to: obtain, from a base station (BS), one or more beam management parameters associated with the beam training procedure.

Aspect 12: The apparatus of aspect 11, where, to obtain the one or more beam management parameters, the first interface is further configured to: obtain, from the BS and via Layer 1 or Layer 3 signaling, control signaling identifying a configuration for the beam training procedure; and obtain, from the BS and via Layer 2 signaling, an indication of a set of options associated with the one or more beam management parameters.

Aspect 13: An apparatus for wireless communication at a third user equipment (UE), including: a processing system; a first interface configured to: obtain, from a first UE, a discovery message of a beam training procedure between the first UE and a second UE, where the discovery message is associated with one or more forwarding termination parameters being satisfied; and the first interface or a second interface configured to: output, to at least the first UE, the second UE, or both, a discovery response message based at least in part on the discovery message.

Aspect 14: The apparatus of aspect 13, where, to obtain the discovery message, the first interface is further configured to: obtain the discovery message via one of a broadcast transmission or a unicast transmission.

Aspect 15: The apparatus of any of aspects 13 through 14, where the first interface or the second interface is further configured to: output, to at least the first UE, the second UE, or both via a broadcast transmission or a unicast transmission, an early termination message based at least in part on receiving the discovery message.

Aspect 16: The apparatus of any of aspects 13 through 15, where the discovery message indicates discovery information including a set of time and frequency resources for the beam training procedure, a location of the second UE, mobility information associated with the second UE, system information, information associated with a serving base station, a beam sweeping pattern for the beam training procedure, or any combination thereof.

Aspect 17: The apparatus of aspect 16, where, to output the discovery response message, the first interface or the second interface is further configured to: obtain the discovery message at a physical layer of the third UE; and output, from the physical layer of the third UE, the discovery response message, where the discovery response message is based at least in part on second discovery information identified at the medium access control (MAC) layer of the third UE.

Aspect 18: The apparatus of any of aspects 16 through 17, where the first interface is further configured to: obtain, from the first UE via a physical sidelink shared channel (PSSCH), a sidelink control information (SCI) message including the discovery information.

Aspect 19: The apparatus of any of aspects 13 through 18, where the processing system is further configured to: generate the discovery response message by one or both of an application layer of the third UE or a physical layer of the third UE, the discovery response message indicating a location of the third UE, a number of beams supported by the third UE, a reference signal received power (RSRP) of a demodulation reference signal (DMRS) of the discovery message, or any combination thereof.

Aspect 20: The apparatus of any of aspects 13 through 19, where the first interface is further configured to: obtain, from a base station (BS), one or more beam management parameters associated with the beam training procedure.

Aspect 21: The apparatus of aspect 20, where, to obtain the one or more beam management parameters, the first interface is further configured to: obtain, from the BS and via Layer 1 or Layer 3 signaling, control signaling identifying a configuration for the beam training procedure; and obtain, from the BS and via Layer 2 signaling, an indication of a set of options associated with the one or more beam management parameters.

Aspect 22: A method for wireless communication at a first UE, including: receiving, from a second UE, a discovery message of a beam training procedure between the first UE and the second UE; and transmitting the discovery message from the second UE to the one or more other UEs when a condition associated with one or more forwarding termination parameters is satisfied.

Aspect 23: The method of aspect 22, further including: selecting one of a broadcast transmission or a unicast transmission for transmitting the discovery message based at least in part on one or more parameters associated with the first UE; and transmitting the discovery message to the one or more other UEs as at least a part of the selected one of the broadcast transmission or the unicast transmission.

Aspect 24: The method of aspect 23, where the one or more parameters associated with the first UE include a type of connection supported by the first UE, an indication of the one of the broadcast transmission or the unicast transmission received via the discovery message, a configuration for the first UE, a status of a network that includes the first UE, or any combination thereof.

Aspect 25: The method of any of aspects 22 through 24, where the condition being satisfied corresponds to an absence of an early termination message, a discovery response message, or both, within a termination window.

Aspect 26: The method of any of aspects 22 through 25, further including: receiving a second discovery message; and refraining from forwarding the second discovery message based at least in part on the condition being unsatisfied.

Aspect 27: The method of aspect 26, further including: receiving an early termination message or a discovery response message within a termination window, where the condition being unsatisfied corresponds to receiving the early termination message or the discovery response message.

Aspect 28: The method of any of aspects 22 through 27, where the discovery message indicates discovery information including a set of time and frequency resources for the beam training procedure, a location of the second UE, mobility information associated with the second UE, system information, information associated with a serving base station, a beam sweeping pattern for the beam training procedure, or any combination thereof.

Aspect 29: The method of aspect 28, further including: receiving the discovery message at a physical layer of the first UE; and transmitting, from the physical layer of the first UE, a discovery response message to the second UE, where the discovery response message is based at least in part on the discovery information, and where the discovery information is identified at a MAC layer of the first UE.

Aspect 30: The method of any of aspects 28 through 29, further including: receiving, from the second UE via a PSSCH, an SCI message including the discovery information.

Aspect 31: The method of any of aspects 22 through 30, further including: generating a discovery response message by one or both of an application layer of the first UE or a physical layer of the first UE; and transmitting, to the second UE, the discovery response message based at least in part on receiving the discovery message, where the discovery response message indicates a location of the first UE, a number of beams supported by the first UE, an RSRP of a DMRS of the discovery message, or any combination thereof.

Aspect 32: The method of any of aspects 22 through 31, further including: receiving, from a base station, one or more beam management parameters associated with the beam training procedure.

Aspect 33: The method of aspect 32, where receiving the one or more beam management parameters includes: receiving, from the base station and via Layer 1 or Layer 3 signaling, control signaling identifying a configuration for the beam training procedure; and receiving, from the base station and via Layer 2 signaling, an indication of a set of options associated with the one or more beam management parameters.

Aspect 34: A method for wireless communication at a third UE, including: receiving, from a first UE, a discovery message of a beam training procedure between the first UE and a second UE, where the discovery message is associated with one or more forwarding termination parameters being satisfied; and transmitting, to at least the first UE, the second UE, or both, a discovery response message based at least in part on the discovery message.

Aspect 35: The method of aspect 34, where receiving the discovery message includes: receiving the discovery message via one of a broadcast transmission or a unicast transmission.

Aspect 36: The method of any of aspects 34 through 35, further including: transmitting, to at least the first UE, the second UE, or both via a broadcast transmission or a unicast transmission, an early termination message based at least in part on receiving the discovery message.

Aspect 37: The method of any of aspects 34 through 36, where the discovery message indicates discovery information including a set of time and frequency resources for the beam training procedure, a location of the second UE, mobility information associated with the second UE, system information, information associated with a serving base station, a beam sweeping pattern for the beam training procedure, or any combination thereof.

Aspect 38: The method of aspect 37, where transmitting the discovery response message includes: receiving the discovery message at a physical layer of the third UE; and transmitting, from the physical layer of the third UE, the discovery response message, where the discovery response message is based at least in part on discovery information identified at a MAC layer of the third UE.

Aspect 39: The method of any of aspects 37 through 38, further including: receiving, from the first UE via a PSSCH, an SCI message including the discovery information.

Aspect 40: The method of any of aspects 34 through 39, further including: generating the discovery response message by one or both of an application layer of the third UE or a physical layer of the third UE, the discovery response message indicating a location of the third UE, a number of beams supported by the third UE, an RSRP of a DMRS of the discovery message, or any combination thereof.

Aspect 41: The method of any of aspects 34 through 40, further including: receiving, from a base station, one or more beam management parameters associated with the beam training procedure.

Aspect 42: The method of aspect 41, where receiving the one or more beam management parameters includes: receiving, from the base station and via Layer 1 or Layer 3 signaling, control signaling identifying a configuration for the beam training procedure; and receiving, from the base station and via Layer 2 signaling, an indication of a set of options associated with the one or more beam management parameters.

Aspect 43: An apparatus for wireless communication at a first UE, including: means for receiving, from a second UE, a discovery message of a beam training procedure between the first UE and the second UE; and means for transmitting the discovery message from the second UE to the one or more other UEs when a condition associated with one or more forwarding termination parameters is satisfied.

Aspect 44: The apparatus of aspect 43, further including: means for selecting one of a broadcast transmission or a unicast transmission for transmitting the discovery message based at least in part on one or more parameters associated with the first UE; and means for transmitting the discovery message to the one or more other UEs as at least a part of the selected one of the broadcast transmission or the unicast transmission.

Aspect 45: The apparatus of aspect 44, where the one or more parameters associated with the first UE include a type of connection supported by the first UE, an indication of the one of the broadcast transmission or the unicast transmission received via the discovery message, a configuration for the first UE, a status of a network that includes the first UE, or any combination thereof.

Aspect 46: The apparatus of any of aspects 43 through 45, where the condition being satisfied corresponds to an absence of an early termination message, a discovery response message, or both, within a termination window.

Aspect 47: The apparatus of any of aspects 43 through 46, further including: means for receiving a second discovery message; and means for refraining from forwarding the second discovery message based at least in part on the condition being unsatisfied.

Aspect 48: The apparatus of aspect 47, further including: means for receiving an early termination message or a discovery response message within a termination window, where the condition being unsatisfied corresponds to receiving the early termination message or the discovery response message.

Aspect 49: The apparatus of any of aspects 43 through 48, where the discovery message indicates discovery information including a set of time and frequency resources for the beam training procedure, a location of the second UE, mobility information associated with the second UE, system information, information associated with a serving base station, a beam sweeping pattern for the beam training procedure, or any combination thereof.

Aspect 50: The apparatus of aspect 49, further including: means for receiving the discovery message at a physical layer of the first UE; and means for transmitting, from the physical layer of the first UE, a discovery response message to the second UE, where the discovery response message is based at least in part on the discovery information, and where the discovery information is identified at a MAC layer of the first UE.

Aspect 51: The apparatus of any of aspects 49 through 50, further including: means for receiving, from the second UE via a PSSCH, an SCI message including the discovery information.

Aspect 52: The apparatus of any of aspects 43 through 51, further including: means for generating a discovery response message by one or both of an application layer of the first UE or a physical layer of the first UE; and means for transmitting, to the second UE, the discovery response message based at least in part on receiving the discovery message, where the discovery response message indicates a location of the first UE, a number of beams supported by the first UE, an RSRP of a DMRS of the discovery message, or any combination thereof.

Aspect 53: The apparatus of any of aspects 43 through 52, further including: means for receiving, from a base station, one or more beam management parameters associated with the beam training procedure.

Aspect 54: The apparatus of aspect 53, where the means for receiving the one or more beam management parameters includes: means for receiving, from the base station and via Layer 1 or Layer 3 signaling, control signaling identifying a configuration for the beam training procedure; and means for receiving, from the base station and via Layer 2 signaling, an indication of a set of options associated with the one or more beam management parameters.

Aspect 55: An apparatus for wireless communication at a third UE, including: means for receiving, from a first UE, a discovery message of a beam training procedure between the first UE and a second UE, where the discovery message is associated with one or more forwarding termination parameters being satisfied; and means for transmitting, to at least the first UE, the second UE, or both, a discovery response message based at least in part on the discovery message.

Aspect 56: The apparatus of aspect 55, where the means for receiving the discovery message includes: means for receiving the discovery message via one of a broadcast transmission or a unicast transmission.

Aspect 57: The apparatus of any of aspects 55 through 56, further including: means for transmitting, to at least the first UE, the second UE, or both via a broadcast transmission or a unicast transmission, an early termination message based at least in part on receiving the discovery message.

Aspect 58: The apparatus of any of aspects 55 through 57, where the discovery message indicates discovery information including a set of time and frequency resources for the beam training procedure, a location of the second UE, mobility information associated with the second UE, system information, information associated with a serving base station, a beam sweeping pattern for the beam training procedure, or any combination thereof.

Aspect 59: The apparatus of aspect 58, where the means for transmitting the discovery response message includes: means for receiving the discovery message at a physical layer of the third UE; and means for transmitting, from the physical layer of the third UE, the discovery response message, where the discovery response message is based at least in part on discovery information identified at a MAC layer of the third UE.

Aspect 60: The apparatus of any of aspects 58 through 59, further including: means for receiving, from the first UE via a PSSCH, an SCI message including the discovery information.

Aspect 61: The apparatus of any of aspects 55 through 60, further including: means for generating the discovery response message by one or both of an application layer of the third UE or a physical layer of the third UE, the discovery response message indicating a location of the third UE, a number of beams supported by the third UE, an RSRP of a DMRS of the discovery message, or any combination thereof.

Aspect 62: The apparatus of any of aspects 55 through 61, further including: means for receiving, from a base station, one or more beam management parameters associated with the beam training procedure.

Aspect 63: The apparatus of aspect 62, where the means for receiving the one or more beam management parameters includes: means for receiving, from the base station and via Layer 1 or Layer 3 signaling, control signaling identifying a configuration for the beam training procedure; and means for receiving, from the base station and via Layer 2 signaling, an indication of a set of options associated with the one or more beam management parameters.

Aspect 64: A non-transitory computer-readable medium storing code for wireless communication at a first UE, the code including instructions executable by a processor to: receive, from a second UE, a discovery message of a beam training procedure between the first UE and the second UE; and transmit the discovery message from the second UE to the one or more other UEs when a condition associated with one or more forwarding termination parameters is satisfied.

Aspect 65: The non-transitory computer-readable medium of aspect 64, where the instructions are further executable by the processor to: select one of a broadcast transmission or a unicast transmission for transmitting the discovery message based at least in part on one or more parameters associated with the first UE; and transmit the discovery message to the one or more other UEs as at least a part of the selected one of the broadcast transmission or the unicast transmission.

Aspect 66: The non-transitory computer-readable medium of aspect 65, where the one or more parameters associated with the first UE include a type of connection supported by the first UE, an indication of the one of the broadcast transmission or the unicast transmission received via the discovery message, a configuration for the first UE, a status of a network that includes the first UE, or any combination thereof.

Aspect 67: The non-transitory computer-readable medium of any of aspects 64 through 66, where the condition being satisfied corresponds to an absence of an early termination message, a discovery response message, or both, within a termination window.

Aspect 68: The non-transitory computer-readable medium of any of aspects 64 through 67, further including: receiving a second discovery message; and refraining from forwarding the second discovery message based at least in part on the condition being unsatisfied.

Aspect 69: The non-transitory computer-readable medium of aspect 68, where the instructions are further executable by the processor to: receive an early termination message or a discovery response message within a termination window, where the condition being unsatisfied corresponds to receiving the early termination message or the discovery response message.

Aspect 70: The non-transitory computer-readable medium of any of aspects 64 through 69, where the discovery message indicates discovery information including a set of time and frequency resources for the beam training procedure, a location of the second UE, mobility information associated with the second UE, system information, information associated with a serving base station, a beam sweeping pattern for the beam training procedure, or any combination thereof.

Aspect 71: The non-transitory computer-readable medium of aspect 70, where the instructions are further executable by the processor to: receive the discovery message at a physical layer of the first UE; and transmit, from the physical layer of the first UE, a discovery response message to the second UE, where the discovery response message is based at least in part on the discovery information, and where the discovery information is identified at a MAC layer of the first UE.

Aspect 72: The non-transitory computer-readable medium of any of aspects 70 through 71, where the instructions are further executable by the processor to: receive, from the second UE via a PSSCH, an SCI message including the discovery information.

Aspect 73: The non-transitory computer-readable medium of any of aspects 64 through 72, where the instructions are further executable by the processor to: generate a discovery response message by one or both of an application layer of the first UE or a physical layer of the first UE; and transmit, to the second UE, the discovery response message based at least in part on receiving the discovery message, where the discovery response message indicates a location of the first UE, a number of beams supported by the first UE, an RSRP of a DMRS of the discovery message, or any combination thereof.

Aspect 74: The non-transitory computer-readable medium of any of aspects 64 through 73, where the instructions are further executable by the processor to: receive, from a base station, one or more beam management parameters associated with the beam training procedure.

Aspect 75: The non-transitory computer-readable medium of aspect 74, where the instructions executable to receive the one or more beam management parameters include instructions executable by the processor to: receive, from the base station and via Layer 1 or Layer 3 signaling, control signaling identifying a configuration for the beam training procedure; and receive, from the base station and via Layer 2 signaling, an indication of a set of options associated with the one or more beam management parameters.

Aspect 76: A non-transitory computer-readable medium for wireless communication at a third UE, the code including instructions executable by a processor to: receive, from a first UE, a discovery message of a beam training procedure between the first UE and a second UE, where the discovery message is associated with one or more forwarding termination parameters being satisfied; and transmit, to at least the first UE, the second UE, or both, a discovery response message based at least in part on the discovery message.

Aspect 77: The non-transitory computer-readable medium of aspect 76, where the instructions executable to receive the discovery message include instructions executable by the processor to: receive the discovery message via one of a broadcast transmission or a unicast transmission.

Aspect 78: The non-transitory computer-readable medium of any of aspects 76 through 77, the code including instructions executable by a processor to: transmit, to at least the first UE, the second UE, or both via a broadcast transmission or a unicast transmission, an early termination message based at least in part on receiving the discovery message.

Aspect 79: The non-transitory computer-readable medium of any of aspects 76 through 78, where the discovery message indicates discovery information including a set of time and frequency resources for the beam training procedure, a location of the second UE, mobility information associated with the second UE, system information, information associated with a serving base station, a beam sweeping pattern for the beam training procedure, or any combination thereof.

Aspect 80: The non-transitory computer-readable medium of aspect 79, where the instructions executable to transmit the discovery response message include instructions executable by the processor to: receive the discovery message at a physical layer of the third UE; and transmit, from the physical layer of the third UE, the discovery response message, where the discovery response message is based at least in part on discovery information identified at a MAC layer of the third UE.

Aspect 81: The non-transitory computer-readable medium of any of aspects 79 through 80, the code including instructions executable by a processor to: receive, from the first UE via a PSSCH, an SCI message including the discovery information.

Aspect 82: The non-transitory computer-readable medium of any of aspects 76 through 81, the code including instructions executable by a processor to: generate the discovery response message by one or both of an application layer of the third UE or a physical layer of the third UE, the discovery response message indicating a location of the third UE, a number of beams supported by the third UE, an RSRP of a DMRS of the discovery message, or any combination thereof.

Aspect 83: The non-transitory computer-readable medium of any of aspects 76 through 82, the code including instructions executable by a processor to: receive, from a base station, one or more beam management parameters associated with the beam training procedure.

Aspect 84: The non-transitory computer-readable medium of aspect 83, where the instructions executable to receive the one or more beam management parameters include instructions executable by the processor to: receive, from the base station and via Layer 1 or Layer 3 signaling, control signaling identifying a configuration for the beam training procedure; and receive, from the base station and via Layer 2 signaling, an indication of a set of options associated with the one or more beam management parameters.

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communications, comprising:
a processing system; and
a first interface configured to:
obtain, for a first user equipment (UE) and from a second UE, a discovery message comprising an indication of resources for a beam training procedure between the first UE and the second UE; and
the first interface or a second interface configured to:
output, based at least in part on a condition associated with one or more forwarding termination parameters being satisfied, the discovery message to one or more other UEs.

2. The apparatus of claim 1, wherein:
the processing system is further configured to:
select one of a broadcast transmission or a unicast transmission for outputting the discovery message based at least in part on one or more parameters associated with the first UE; and
the first interface or the second interface is further configured to:
output the discovery message to the one or more other UEs as at least a part of the selected one of the broadcast transmission or the unicast transmission.

3. The apparatus of claim 2, wherein the one or more parameters associated with the first UE comprise a type of connection supported by the first UE, an indication of the selected one of the broadcast transmission or the unicast transmission obtained via the discovery message, a configuration for the first UE, a status of a network that includes the first UE, or any combination thereof.

4. The apparatus of claim 1, wherein the condition being satisfied corresponds to an absence of an early termination message, a discovery response message, or both, within a termination window.

5. The apparatus of claim 1, wherein:
the first interface is further configured to:
obtain a second discovery message; and
the processing system is further configured to:
refrain from forwarding the second discovery message based at least in part on the condition being unsatisfied for the second discovery message.

6. The apparatus of claim 5, wherein the first interface is further configured to:
obtain an early termination message or a discovery response message within a termination window, wherein the condition being unsatisfied corresponds to obtaining the early termination message or the discovery response message.

7. The apparatus of claim 1, wherein the discovery message indicates discovery information comprising a set of time and frequency resources for the beam training procedure, a location of the second UE, mobility information associated with the second UE, system information, information associated with a serving base station (BS), a beam sweeping pattern for the beam training procedure, or any combination thereof.

8. The apparatus of claim 7, wherein:
the first interface is further configured to:
obtain the discovery message at a physical layer of the first UE; and
the first interface or the second interface is further configured to:
output, from the physical layer of the first UE, a discovery response message to the second UE, wherein the discovery response message is based at least in part on the discovery information, and wherein the discovery information is identified at a medium access control (MAC) layer of the first UE.

9. The apparatus of claim 7, wherein the first interface is further configured to:
obtain, from the second UE via a physical sidelink shared channel (PSSCH), a sidelink control information (SCI) message comprising the discovery information.

10. The apparatus of claim 1, wherein:
the processing system is further configured to:
generate a discovery response message by one or both of an application layer of the first UE or a physical layer of the first UE; and
the first interface or the second interface is further configured to:
output, to the second UE, the discovery response message based at least in part on obtaining the discovery message, wherein the discovery response message indicates a location of the first UE, a number of beams supported by the first UE, a reference signal received power (RSRP) of a demodulation reference signal (DMRS) of the discovery message, or any combination thereof.

11. The apparatus of claim 1, wherein the first interface is further configured to:
obtain, from a base station (BS), one or more beam management parameters associated with the beam training procedure.

12. The apparatus of claim 11, wherein, to obtain the one or more beam management parameters, the first interface is further configured to:
obtain, from the BS and via Layer 1 or Layer 3 signaling, control signaling identifying a configuration for the beam training procedure; and
obtain, from the BS and via Layer 2 signaling, an indication of a set of options associated with the one or more beam management parameters.

13. An apparatus for wireless communication at a third user equipment (UE), comprising:
a processing system; and
a first interface configured to:
obtain, from a first UE, a discovery message comprising an indication of resources for a beam training procedure between the first UE and a second UE, wherein the discovery message is associated with one or more forwarding termination parameters being satisfied; and
the first interface or a second interface configured to:
output, to at least the first UE, the second UE, or both, a discovery response message based at least in part on the discovery message.

14. The apparatus of claim 13, wherein, to obtain the discovery message, the first interface is further configured to:

obtain the discovery message via one of a broadcast transmission or a unicast transmission.

15. The apparatus of claim 13, wherein the first interface or the second interface is further configured to:
output, to at least the first UE, the second UE, or both via a broadcast transmission or a unicast transmission, an early termination message based at least in part on obtaining the discovery message.

16. The apparatus of claim 13, wherein the discovery message indicates discovery information comprising a set of time and frequency resources for the beam training procedure, a location of the second UE, mobility information associated with the second UE, system information, information associated with a serving base station (BS), a beam sweeping pattern for the beam training procedure, or any combination thereof.

17. The apparatus of claim 16, wherein, to output the discovery response message, the first interface or the second interface is further configured to:
obtain the discovery message at a physical layer of the third UE; and
output, from the physical layer of the third UE, the discovery response message, wherein the discovery response message is based at least in part on second discovery information identified at a medium access control (MAC) layer of the third UE.

18. The apparatus of claim 16, wherein the first interface is further configured to:
obtain, from the first UE via a physical sidelink shared channel (PSSCH), a sidelink control information (SCI) message comprising the discovery information.

19. The apparatus of claim 13, wherein the processing system is further configured to:
generate the discovery response message by one or both of an application layer of the third UE or a physical layer of the third UE, the discovery response message indicating a location of the third UE, a number of beams supported by the third UE, a reference signal received power (RSRP) of a demodulation reference signal (DMRS) of the discovery message, or any combination thereof.

20. The apparatus of claim 13, wherein the first interface is further configured to:
obtain, from a base station (B S), one or more beam management parameters associated with the beam training procedure.

21. A method for wireless communication at a first user equipment (UE), comprising:
receiving, from a second UE, a discovery message comprising an indication of resources for a beam training procedure between the first UE and the second UE; and
transmitting, based at least in part on a condition associated with one or more forwarding termination parameters being satisfied, the discovery message to one or more other UEs.

22. The method of claim 21, further comprising:
selecting one of a broadcast transmission or a unicast transmission for transmitting the discovery message based at least in part on one or more parameters associated with the first UE; and
transmitting the discovery message to the one or more other UEs as at least a part of the selected one of the broadcast transmission or the unicast transmission.

23. The method of claim 22, wherein the one or more parameters associated with the first UE comprise a type of connection supported by the first UE, an indication of the one of the broadcast transmission or the unicast transmission received via the discovery message, a configuration for the first UE, a status of a network that includes the first UE, or any combination thereof.

24. The method of claim 21, wherein the condition being satisfied corresponds to an absence of an early termination message, a discovery response message, or both, within a termination window.

25. The method of claim 21, wherein the discovery message indicates discovery information comprising a set of time and frequency resources for the beam training procedure, a location of the second UE, mobility information associated with the second UE, system information, information associated with a serving base station (BS), a beam sweeping pattern for the beam training procedure, or any combination thereof.

26. The method of claim 25, further comprising:
receiving the discovery message at a physical layer of the first UE; and
transmitting, from the physical layer of the first UE, a discovery response message to the second UE, wherein the discovery response message is based at least in part on the discovery information, and wherein the discovery information is identified at a medium access control (MAC) layer of the first UE.

27. The method of claim 25, further comprising:
receiving, from the second UE via a physical sidelink shared channel (PSSCH), a sidelink control information (SCI) message comprising the discovery information.

28. A method for wireless communication at a third user equipment (UE), comprising:
receiving, from a first UE, a discovery message comprising an indication of resources for a beam training procedure between the first UE and a second UE, wherein the discovery message is associated with one or more forwarding termination parameters being satisfied; and
transmitting, to at least the first UE, the second UE, or both, a discovery response message based at least in part on the discovery message.

29. The method of claim 28, wherein receiving the discovery message comprises:
receiving the discovery message via one of a broadcast transmission or a unicast transmission.

30. The method of claim 28, further comprising:
transmitting, to at least the first UE, the second UE, or both via a broadcast transmission or a unicast transmission, an early termination message based at least in part on receiving the discovery message.

* * * * *